United States Patent
Holzer et al.

(10) Patent No.: US 11,869,135 B2
(45) Date of Patent: Jan. 9, 2024

(54) CREATING ACTION SHOT VIDEO FROM MULTI-VIEW CAPTURE DATA

(71) Applicant: Fyusion, Inc., San Francisco, CA (US)

(72) Inventors: Stefan Johannes Josef Holzer, San Mateo, CA (US); Julius Santiago, San Francisco, CA (US); Milos Vlaski, San Francisco, CA (US); Endre Ajandi, San Francisco, CA (US); Radu Bogdan Rusu, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 0 days.

(21) Appl. No.: 17/144,866

(22) Filed: Jan. 8, 2021

(65) Prior Publication Data

US 2021/0225065 A1 Jul. 22, 2021

Related U.S. Application Data

(60) Provisional application No. 62/961,826, filed on Jan. 16, 2020.

(51) Int. Cl.
  *G06T 15/20* (2011.01)
  *G06T 13/20* (2011.01)
  *H04N 13/282* (2018.01)

(52) U.S. Cl.
  CPC .............. *G06T 15/20* (2013.01); *G06T 13/20* (2013.01); *H04N 13/282* (2018.05)

(58) Field of Classification Search
  None
  See application file for complete search history.

(56) References Cited

U.S. PATENT DOCUMENTS

| 8,824,861 B2 * | 9/2014 | Gentile | G11B 27/034 |
| | | | 386/278 |
| 9,070,402 B2 | 6/2015 | Burtnyk | |
| 9,088,550 B1 * | 7/2015 | Taraki | G06F 21/10 |
| 10,055,898 B1 * | 8/2018 | Wang | G06T 7/593 |
| 10,176,405 B1 | 1/2019 | Zhou | |
| 2014/0199050 A1 * | 7/2014 | Khalsa | H04N 9/8205 |
| | | | 386/280 |
| 2014/0206443 A1 * | 7/2014 | Sharp | G06T 7/593 |
| | | | 463/31 |

(Continued)

FOREIGN PATENT DOCUMENTS

| KR | 1020170053557 A | 5/2017 |
| WO | 2020009948 A1 | 1/2020 |

OTHER PUBLICATIONS

International Search Report and Written Opinion for App. No. PCT/US2021/013474, dated May 4, 2021, 7 pages.

(Continued)

*Primary Examiner* — Anh-Tuan V Nguyen
(74) *Attorney, Agent, or Firm* — Kwan & Olynick LLP

(57) ABSTRACT

A three-dimensional representation of a scene captured in an action shot base video may be determined. The three-dimensional representation may identify a camera pose. A representation of an object may be determined from a multi-view representation of the object that includes images of the object and that is navigable in one or more dimensions. An action shot video of the scene that includes a rendering of the object determined based on the representation and the camera pose may be generated.

18 Claims, 24 Drawing Sheets
(10 of 24 Drawing Sheet(s) Filed in Color)

(56) References Cited

U.S. PATENT DOCUMENTS

| | | | |
|---|---|---|---|
| 2014/0375634 A1* | 12/2014 | Hillesland | G06T 15/20 |
| | | | 345/420 |
| 2017/0091996 A1 | 3/2017 | Wei | |
| 2017/0098312 A1* | 4/2017 | Souchard | H04N 13/344 |
| 2017/0109930 A1* | 4/2017 | Holzer | G06T 13/20 |
| 2017/0171499 A1* | 6/2017 | Dodballapur | G06T 7/20 |
| 2017/0244956 A1* | 8/2017 | Stiglic | H04N 7/181 |
| 2018/0054659 A1 | 2/2018 | Goswami | |
| 2018/0114264 A1* | 4/2018 | Rafii | G06T 15/50 |
| 2018/0160102 A1 | 6/2018 | Luo | |
| 2018/0255290 A1 | 9/2018 | Holzer | |
| 2018/0322670 A1* | 11/2018 | Tanda | G06V 40/25 |
| 2019/0335156 A1 | 10/2019 | Rusu | |
| 2020/0053347 A1* | 2/2020 | Marchak, Jr. | G06T 7/292 |
| 2020/0391109 A1 | 12/2020 | Myhill | |
| 2021/0031104 A1* | 2/2021 | Labute | G06T 15/20 |
| 2021/0150804 A1* | 5/2021 | Wick | G06T 15/506 |
| 2021/0166476 A1* | 6/2021 | Alesmaa | G06T 15/04 |
| 2021/0225084 A1* | 7/2021 | O'Connell | G06F 3/017 |

OTHER PUBLICATIONS

International Search Report and Written Opinion for App. No. PCT/US2021/013469, dated May 11, 2021, 10 pages.
Office Action (Notice of Allowance and Fees Due (PTOL-85)) dated Oct. 5, 2021 for U.S. Appl. No. 17/147,377 (pp. 1-8).

* cited by examiner

CREATING ACTION SHOT VIDEO FROM MULTI-VIEW CAPTURE DATA

PRIORITY CLAIM

The present application claims priority under 35 U.S.C. 120 to U.S. Patent App. No. 62/961,826, titled "Creating Action Shot Video from Multi-View Capture Data", filed Jan. 16, 2020 by Holzer, which is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

The present disclosure relates generally to the processing of visual digital media content, and more specifically to the creation of video from image data.

DESCRIPTION OF RELATED ART

Visual data encompasses a wide variety of information, such as individual images, video, and multi-view captures. Images and multi-view captures are useful and informative tools for presenting information about objects, for instance in an online platform. However, they lack to the ability to create the same excitement and sense of presence as a video. Nevertheless, videos for many objects do not exist. Further, even when video of an object is available, the video may present the object in the wrong context.

OVERVIEW

Provided are various mechanisms and processes relating to the processing of visual media data. According to various embodiments, techniques and mechanisms described herein may facilitate action shot video creation from multi-view capture data.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The included drawings are for illustrative purposes and serve only to provide examples of possible structures and operations for the disclosed inventive systems, apparatus, methods and computer program products for processing visual data. These drawings in no way limit any changes in form and detail that may be made by one skilled in the art without departing from the spirit and scope of the disclosed implementations.

DETAILED DESCRIPTION

Figure 1:
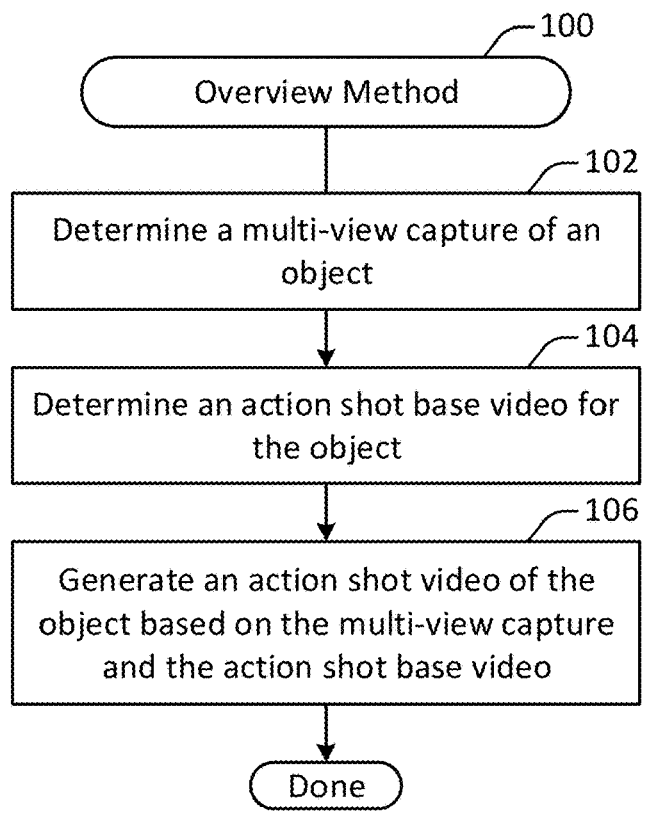
FIG. 1 illustrates one example of an overview method, performed in accordance with one or more embodiments.

Action shot videos are short videos used to present an object. For example, an action shot video of an object may involve a camera panning around the video to show the object from different angles. Such videos may be used to present the object, for instance in an advertising context on the internet.

According to various embodiments, an action shot video may involve presenting an object in an active context. For example, a vehicle may be shown driving down a road. As another example, an article of clothing may be shown as being worn by a person walking down a street. As still another example, a laptop computer may be shown as being carried and used by a person in a business setting.

Many objects lack such videos, and creating them with conventional techniques can be difficult and expensive. For instance, an object such as a vehicle must first be positioned in a suitable (e.g., attractive) context. A video of the object must then be captured in the context. Finally, the video must often be post-processed, such as with one or more editing and/or compression techniques, to render the video suitable for presentation.

In addition, conventional techniques yield static videos with fixed contexts that may be less than ideal for many viewers. For instance, consider an action shot video used to promote a vehicle. Some users may prefer to see a vehicle presented in an urban environment, while others may prefer to see the vehicle in a wooded setting. However, cost and difficulty typically preclude the creation of action shots of the same object in a variety of settings.

According to various embodiments, techniques and mechanisms described herein provide for action shot video creation from multi-view capture data. A multi-view capture of an object may be created. For instance, a user may employ a mobile computing device such as a mobile phone to create a multi-view capture of the object. Separately, one or more action shot base videos may be used to capture different background contexts. An action shot video of the object may then be created by combining the multi-view capture of the object with a selected action shot base video.

According to various embodiments, techniques and mechanisms described herein may be used to generate an action shot video of an object without repositioning the object in a specific context. Instead, a user may capture a multi-view capture of the object in any setting and then use the multi-view capture to create the action shot video.

In some implementations, techniques and mechanisms described herein may be used to generate action shot videos of an object in different contexts, without repositioning the object in different contexts. Instead, action shot base videos may be captured of a variety of contexts, and then combined with a suitable multi-view capture to position the object within the selected context. For instance, an object may be positioned in a context that is specific to the viewer of the action shot video.

According to various embodiments, some techniques and mechanisms are described herein with reference to automobiles. However, vehicles are employed as an example for the purpose of illustration, and techniques and mechanisms described herein are not limited to vehicles. Rather, techniques and mechanisms described herein are applicable to a wide variety of contexts and objects.

FIG. 1 illustrates one example of an overview method 100, performed in accordance with one or more embodiments. According to various embodiments, the method 100 may be performed on any suitable computing device. For example, the method 100 may be performed on a mobile computing device such as a mobile phone or laptop computer. As another example, the method 100 may be performed on a computing device such as a server.

A multi-view capture of an object is determined at 102. According to various embodiments, a multi-view capture may include various multi-view capture data. Multi-view capture data may include two or more perspective view images of the object captured from different perspectives relative to the object. Multi-view capture data may also include inertial measurement unit (IMU) data captured from an IMU, for instance within a mobile computing device.

In some implementations, a multi-view capture may be generated during the execution of the method 100. Alternately, a multi-view capture may be pre-generated and retrieved at 102. For instance, at 102 a user may provide user input to select a multi-view capture for action shot video generation. Additional details regarding the creation of multi-view captures are discussed throughout the application, for example with respect to FIGS. 5-18.

An action shot base video for the object is determined at 104. According to various embodiments, an action shot base video may include video footage of a background context in which an object may be positioned. For example, an action shot base video may include video footage captured from a camera as the camera moves along a path through space.

In particular embodiments, an action shot base video of a moving point in space may be captured. For example, the action shot base video may include footage of a point in space as it moves along a road. Such an action shot base video may be suitable, for example, for generating an action shot video of a vehicle.

According to various embodiments, the action shot base video may be generated during the execution of the method 100. As discussed herein with respect to multi-view captures, to capture an action shot base video the camera may move along a path that is concave with respect to the captured imagery. For example, the camera may be moved along a 360-degree path around a point in space to allow the object to be virtually positioned at the point in space. In some configurations, multiple action shot base videos may be captured of the same scene, for instance to facilitate more accurate estimation of the lighting conditions (e.g., the location of light sources). The camera may be a camera within a mobile computing device such as a mobile phone.

In some embodiments, an action shot base video may be pre-generated and retrieved at 104. For instance, pre-generated action shot base videos may be captured of different types of scenes and context. Then, at 104 a user may provide user input to select an action shot base video for action shot video generation. In some configurations, one or more pre-generated action shot base video may be selected at least in part based on an automatic determination.

According to various embodiments, the object that is the subject of the multi-view capture determined at 102 may be analyzed. Object detection may then be performed on the multi-view capture data to identify the object type. One or more suitable action shot base videos may then be selected based on the object type. For example, if the object is a kitchen appliance or utensil, an action shot base video of a kitchen setting may be selected. As another example, if the object is a vehicle, then an action shot base video of an outdoor setting may be selected. For instance, a rugged setting may be selected fora sport utility video, while an urban setting may be selected for a luxury sedan.

An action shot video of the object is generated at 106 based on the multi-view capture and the action shot base video. According to various embodiments, various techniques may be used to generate the action shot video. Examples of such techniques are discussed throughout the application, for example with respect to the methods 200, 300, and 400 shown in FIGS. 2, 3, and 4.

Figure 2:
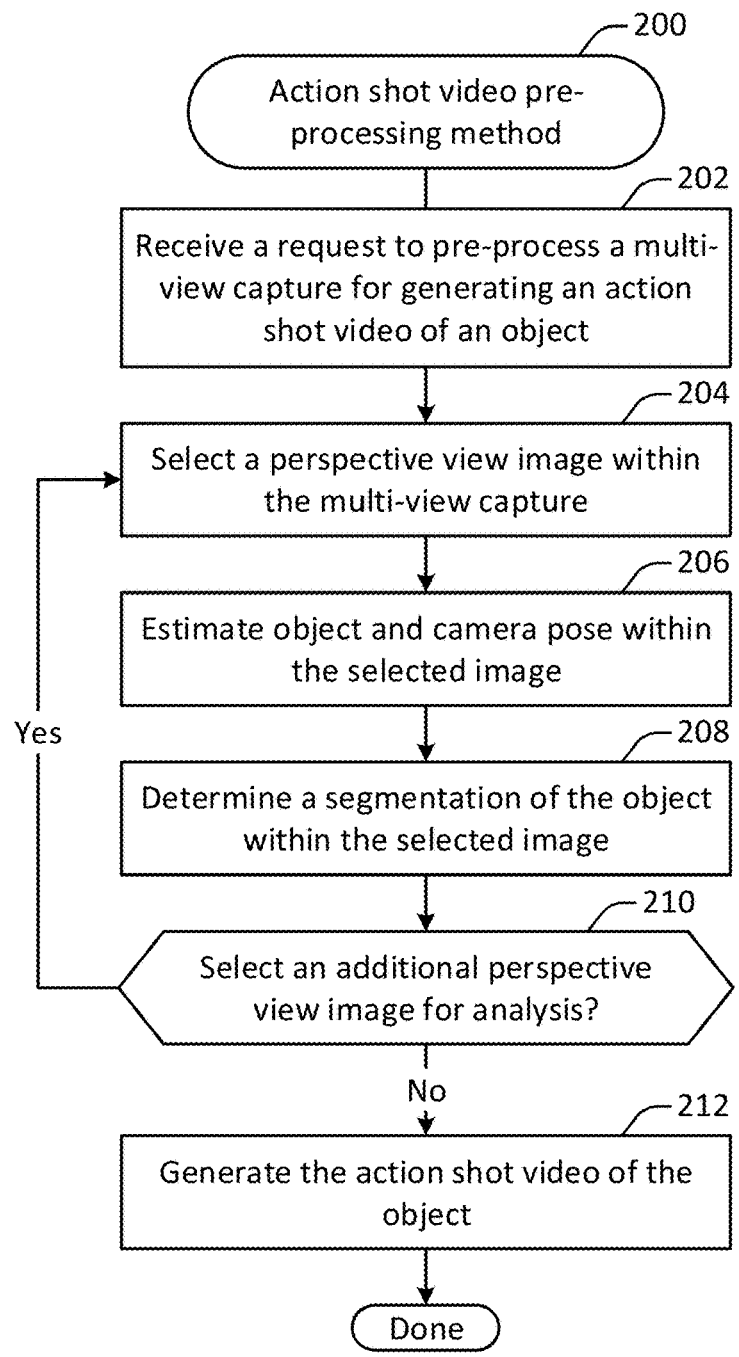
FIG. 2 illustrates an example of an action shot video pre-processing method, performed in accordance with one or more embodiments.

FIG. 2 illustrates one example of an action shot video pre-processing method 200, performed in accordance with one or more embodiments. According to various embodiments, the method 200 may be performed on any suitable computing device. For example, the method 200 may be performed on a mobile computing device such as a mobile phone or laptop computer. As another example, the method 200 may be performed on a computing device such as a server.

A request to pre-process a multi-view capture for generating an action shot video of an object is received at 202. According to various embodiments, the request may be received as part of the operation of the method 100. For example, the request may be received after the multi-view capture and base action shot video have been identified as discussed with respect to the operations 104 and 106.

A perspective view image within the multi-view capture is selected at 204. According to various embodiments, images within the multi-view capture may be selected for analysis in sequence, in parallel, at random, or in any suitable order.

Object and camera pose within the selected image are estimated at 206. According to various embodiments, the camera poses may be extracted using a computer vision algorithm. Additional details regarding pose detection, which is also referred to herein as object orientation detection, are discussed with respect to FIGS. 19 and 20. As used herein, the term camera pose may refer to the viewpoint or viewing angle of the camera relative to the object captured in the image.

According to various embodiments, camera pose information may be estimated for a viewpoint in order to associate each image in a sequence of images with a viewpoint. Camera-poses may be estimated by an algorithm that uses the images and, optionally, additional information received from the capturing device. Such information may include angle, location, acceleration, velocity, drift correction, or other such data collected or determined based on information from a gyroscope, an accelerometer, magnetometer, or other such sensor associated with the camera. Such input data may be used to facilitate the determination of camera pose information using a bundle adjustment procedure. The estimated poses provide information about the relative position of the camera towards the object of interest. Additional details regarding the estimation of an object pose are discussed with respect to the method 300 shown in FIG. 3.

A segmentation of the object within the selected image is determined at 208. According to various embodiments, object segmentation may involve separating the object from the background. Alternately, or additionally, the object may then be divided into one or more components. For example, skeleton detection may be performed on the object. Additional details regarding skeleton detection are discussed in co-pending and commonly assigned U.S. patent application Ser. No. 15/427,026, titled "Skeleton Detection and Tracking via Client-server Communication" by Holzer et al, filed Feb. 7, 2017, which is hereby incorporated by reference in its entirety and for all purposes.

In particular embodiments, object segmentation may involve identifying one or more objects that are targeted for animation. For example, one or more wheels of a vehicle may be identified separately from the rest of a vehicle so that the wheels may be animated when constructing the action shot video.

In some implementations, segmentation may be performed on a per-frame basis. When using such an approach, a bounding box may be detected for each frame. Each bounding box crop may be independent segmented into a foreground and a background. For example, in the case of a vehicle, an image may be segmented into the vehicle (i.e. foreground) and the background using a neural network trained on images of vehicles.

In some implementations, segmentation may be performed on a multi-view capture basis. When using such an approach, camera pose information and per-frame segmentations may be performed to carve space resulting in a rough mesh of the object, such as a vehicle. The 3D object mesh may then be projected into each frame to obtain a consistent segmentation over all frames.

According to various embodiments, one or more neural networks may be employed as part of the object segmentation procedure. For example, a neural network may be used to predict a 3D shape of an object from one or more perspective view images. As another example, a neural network may be used to perform space carving on an image to determine an object segmentation mask.

In some implementations, a per-view texture map may be determined. Under such an approach, a viewpoint close to a virtual camera may be used for texturing a 3D model when rendering it into a new scene.

A determination is made at 210 as to whether to select an additional perspective view image for analysis. According to various embodiments, additional perspective view images may be selected until all suitable perspective view images within the multi-view capture have been analyzed.

The action shot video of the object is generated at 212. Additional details regarding the generation of the action shot video are discussed with respect to the method 400 shown in FIG. 4.

Figure 3:
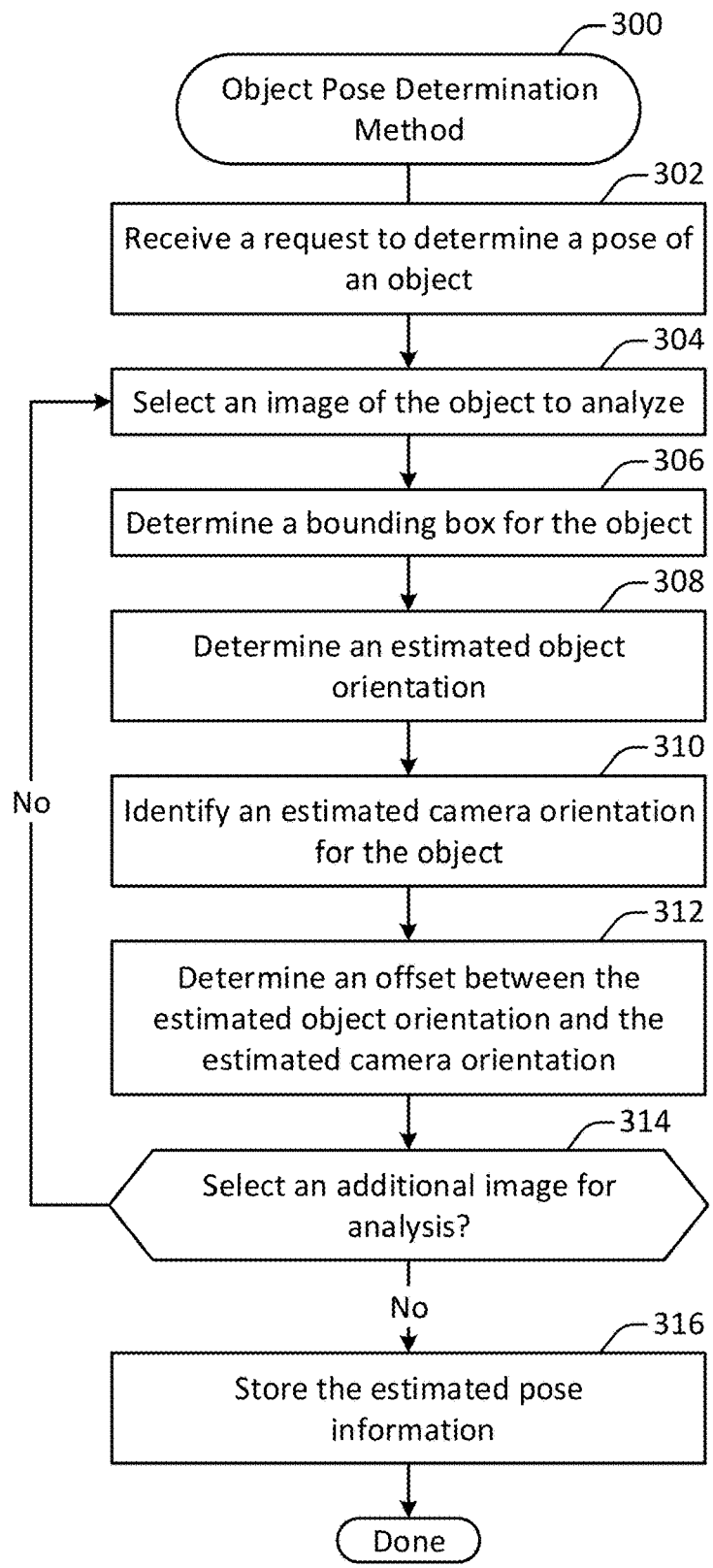
FIG. 3 illustrates a method of determining a pose of an object, performed in accordance with one or more embodiments.

FIG. 3 illustrates a method 300 of determining a pose of an object, performed in accordance with one or more embodiments. The method 300 may be performed on any suitable computing device. For example, the method 300 may be performed on a mobile computing device such as a smart phone. Alternately or additionally, the method 300 may be performed on a remote server.

A request to determine a pose of an object is received at 302. According to various embodiments, the request may be received at a user interface. For example, the request may be received via an application at a mobile computing device. As another example, the request may be received at a user interface at a laptop.

At 304, an image of the object is selected for analysis. According to various embodiments, the image may be a single two-dimensional image of the object. Alternately or additionally, the image may be one of a series of two-dimensional images of the object captured from different viewpoints. In some implementations, the image may be a single frame of a video stream of the object. In some embodiments, the image may be a 360-degree multi-view capture of the object. Alternately, the image may include a view that has less than 360-degree coverage.

Optionally, a bounding box for the object is determined at 306. According to various embodiments, a bounding box for the object may include coordinates of a rectangular or non-rectangular border that encloses the object in the selected image. The bounding box may be determined by a neural network. For example, a neural network may be trained to determine the coordinates of the visible object pixels in an image of the object. The neural network may facilitate the determination of the pixel coordinates and the width, height, or other characteristics of the bounding box enclosing the object. Alternately or additionally, the bounding box may be determined by a different type of algorithm. In some configurations, the bounding box may be determined at least in part based on user input. For example, the bounding box may be determined by a user super-imposing a border on the image to enclose the object. In another example, the bounding box may be determined by the user tapping on the object with an algorithm automatically estimating the extent of the bounding based on the selection. In yet another example, the user may select points or regions in the foreground and background, and an algorithm automatically separates both to estimate the extent of a corresponding bounding box.

At 308, an estimated object orientation is determined. According to various embodiments, the estimated object orientation may be determined by a neural network. For example, a neural network may be trained to determine the estimated object orientation through an analysis of the object from one or more images of an object. The estimated object orientation may include estimates about an object's roll, elevation, angular position, attitude, and azimuth angle.

An estimated camera orientation is identified at 310. According to various embodiments, camera orientation may be estimated from data collected from an inertial measurement unit (IMU). In some implementations, the IMU may be associated with a mobile computing device, such as a smartphone. For example, a mobile computing device may include sensors such as a camera capable of capturing visual data such as an image or video stream. A mobile computing device may also include an accelerometer, a gyroscope, and other such sensors capable of capturing IMU data. IMU data may include information such as camera location, camera angle, device velocity, device acceleration, or any of a wide variety of data collected from accelerometers or other such sensors.

In some implementations, IMU orientation may identify orientation information associated with the camera. The IMU orientation may then be used to infer orientation information about the object. For example, the IMU orientation may indicate that the image was captured with a camera located at a particular height and angle relative to the object and/or ground. Alternatively, or additionally, the orientation estimation might be done using a pose estimation algorithm based on image data. In some configurations, the pose estimation method might also consider the available IMU data.

At 312, an offset is determined between the estimated object orientation and the estimated camera orientation. According to various embodiments, the determination may be made at least in part by identifying a difference between the two values. Alternately, or additionally, the determination may be made at least in part by refining the object orientation based on additional information characterizing the position and angle of the camera.

A determination is made at 314 as to whether to select an additional image of the object for analysis. In some implementations, additional images may be selected until all available images have been analyzed. For example, each image associated with a multi-view capture may be analyzed. If multiple images have been processed, then a combined offset may be to be calculated. For example, the offset can be averaged from the results obtained from multiple images. In another example, a robust method for estimating the final offset from multiple computed offsets might be used, for instance to handle outliers such as an inaccurate orientation estimation for certain images.

In some embodiments, the determination made at 314 may be made at least in part automatically. For example, the estimated object orientation procedure at 308 may attempt to estimate an orientation for the object, but may fail due to incomplete image information or other information. A determination may be automatically made to prompt the user to capture or upload additional images of the object.

In some implementations, the determination made at 314 may be made at least in part as a request by a user. For example, a user may be prompted to select an additional image for analysis. Alternately or additionally, a user may be prompted to review an estimated object orientation, and a user may review the estimated object orientation and may elect to analyze additional images of the object in order to improve the accuracy or quality of the estimated object orientation. In some implementations, every N-th frame of the multi-view capture might be processed.

At 316, the pose estimation information is stored. According to various embodiments, storing the orientation estimation information may involve storing one or more orientation values for each of the images analyzed in FIG. 3. For example, orientation information may be stored to supplement a multi-view capture.

In some implementations, the orientation estimation may be stored on a storage device. Alternately, or additionally, the orientation estimation may be transmitted to a remote location via a network. According to various embodiments, one or more operations shown in FIG. 3 may be omitted. For example, any or all of operations 310 and 312 may be omitted.

Figure 4:
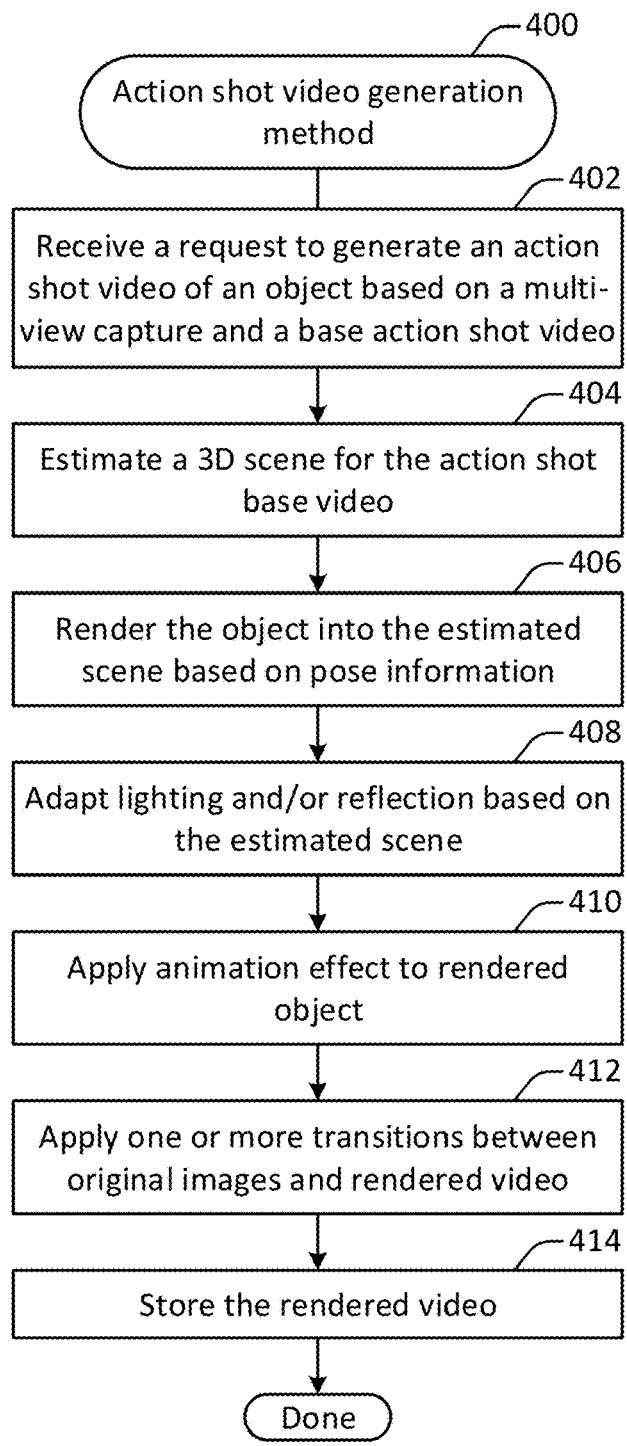
FIG. 4 illustrates one example of a method for generating an action shot video, performed in accordance with one or more embodiments.

FIG. 4 illustrates one example of an action shot video generation method 400, performed in accordance with one or more embodiments. The method 300 may be performed on any suitable computing device. For example, the method 400 may be performed on a mobile computing device such as a smart phone. Alternately or additionally, the method 400 may be performed on a remote server.

A request to generate an action shot video of an object based on a multi-view capture and a base action shot video is received at 402. According to various embodiments, the request may be received as part of the process discussed with respect to the method 100 shown in FIG. 1. For example, the request may be received after the multi-view capture of an object is determined at 102 and an action shot base video for the object is determined at 104.

A 3D scene for the action shot base video is estimated at 404. According to various embodiments, estimating the three-dimensional scene for the action shot base video may involve determining a modeled representation of the three-dimensional scene. The modeled representation may include information such as a three-dimensional model of a surface such as the ground. Alternately, or additionally, the modeled representation may include information such as a three-dimensional model of one or more objects included in the scene, such as one or more trees.

In some embodiments, a virtual scene may be used for the action shot base video. The virtual scene may be, for example, a video of an environment representing a three-dimensional model. For instance, the virtual scene may include a virtual road and one or more virtual background elements such as trees, bushes, or road signs. The virtual scene may be represented as a wire-frame. Alternately, or additionally, a surface texture map may be applied to one or more elements within the virtual scene.

In some embodiments, when a virtual scene is employed, estimating the 3D scene may involve retrieving model information associated with the generation of the virtual scene. For example, virtual coordinates associated with a surface and/or one or more background elements may be retrieved or dynamically generated.

In some implementations, a video of a real scene may be used for the action shot base video. The real scene may be, for example, a point in space moving down a road, as a camera pans around the point in space. In such a situation, estimating the 3D scene may involve one or more operations associated with determining a three-dimensional model. For instance, the video may be analyzed to determine coordinates for a ground surface associated with the scene. Then, background elements such as trees, signs, and bushes may be analyzed to locate them within the virtual environment. Once located, such objects may be represented by, for example, coordinates and three-dimensional skeletons within the three-dimensional model.

The object is rendered into the estimated scene based on pose information at 406. According to various embodiments, rendering the object into the scene may involve one or more operations for visually positioning the object within the video scene.

In some embodiments, rendering an object into a scene may involve identifying a viewpoint of an object that aligns with a viewpoint of the action shot base video. For instance, the multi-view capture may include a number of images of the object each captured from a respective perspective viewpoint, while the action shot base video may include a camera that pans around a point in space. For successive frames of the action shot base video, a suitable image may be selected from the perspective view images. For example, camera and object pose information estimated at 206 may be compared with the 3D scene estimated at 404 to select an image of the object from the multi-view capture that aligns with the camera perspective at a particular point in the action shot base video.

In some implementations, rendering an object into a scene may involve positioning the object based on the 3D scene estimated at 404. Such information may be used to position the object realistically within the scene. For example, a vehicle may be positioned on the ground and in front of or behind a tree.

In some embodiments, rendering an object into a scene may involve generating a view of an object from a novel viewpoint. For instance, the multi-view capture may include a number of static images of the object each captured from a respective perspective viewpoint. However, the action shot base video may include a camera that pans continuously around a point in space. Accordingly, rendering the object into the scene may involve generating an image of the object that does not exist in the underlying multi-view capture.

In some implementations, a novel viewpoint of an object may be generated from a set of perspective view images using light field reconstruction. Techniques and mechanisms for rendering a novel viewpoint of an object are discussed in additional detail in co-pending and commonly assigned U.S. patent application Ser. No. 16/574,622, titled FREE-VIEWPOINT PHOTOREALISTIC VIEW SYNTHESIS FROM CASUALLY CAPTURED VIDEO, by Kar et al., filed Sep. 18, 2019, which is hereby incorporated by reference in its entirety and for all purposes.

Lighting and/or one or more reflections are adapted at 408 based on the estimated scene. According to various embodiments, adapting lighting and/or one or more reflections may involve one or more operations for altering the appearance of the object to blend the object with the background scene. For example, if the object is shiny, as may be the case for a new vehicle, the object may reflect the background of the context in which the multi-view image was captured. However, the original context may differ from the context associated with the action shot base video. For example, a multi-view capture of a vehicle may be captured in a vehicle dealership parking lot, while the action shot base video may be of a road through a forest. In this example, the original reflection of the parking lot may be replaced with a reflection of the road and forest in the action shot base video.

According to various embodiments, adapting lighting and/or one or more reflections may involve one or more operations for altering the appearance of the action shot video to blend the action shot video with the object. For example, if the action shot base video includes a reflective surface such as a lake, then the lake may be altered to appear to reflect an object such as a vehicle driving along a road positioned near the lake.

According to various embodiments, adapting lighting and/or one or more reflections may involve reconciling one or more light source differences between the multi-view capture of the object and the action shot base video. For example, the action shot base video may be analyzed to identify a location of one or more light sources such as the sun. A similar analysis may be performed on the one or more images included in the multi-view capture. Then, one or more visual elements such as glare and/or reflections on the object may be updated to adjust for the change in light source location.

One or more animation effects are applied to the rendered object at 410. In some implementations, an animation effect may be used to cause an object to appear to be realistically situated within an action shot video. For example, an action shot base video of a road may be combined with a multi-view capture of an unmoving video. In such a situation, the vehicle's wheels may be animated to cause the vehicle to appear to be moving, even though the vehicle was not moving when the multi-view capture was constructed and even though the multi-view capture includes static images rather than videos.

According to various embodiments, a variety of animation effects may be used. For instance, a rotation animation may be applied to a vehicle steering wheel and/or one or more vehicle wheels to cause the vehicle to appear to be turning. As another example, a vehicle's wheels and/or frame may be animated so as to appear to be responding to bumps in a road.

One or more transitions between the original images and the rendered video are applied at 412. According to various embodiments, a transition may involve any visual change from one context to another. For example, a background portion of a static image may fade away into a fixed or static image associated with an action view video. As another example, a background portion of a multi-view capture image may shrink in size toward the object, revealing until the background portion disappears.

The rendered video is stored at 414. According to various embodiments, storing the rendered video may involve transmitting the rendered video to a storage device. The storage device may be located locally, such as is the case when the video is stored to a local hard drive. Alternately, or additionally, the rendered video may be transmitted to a remote location, such as a remote server, a mobile computing device, or a network attached storage device.

According to various embodiments, one or more of the operations shown in FIG. 4 may be omitted. For example, one or more of operations 408, 410, or 412 need not necessarily be performed.

Figure 19:
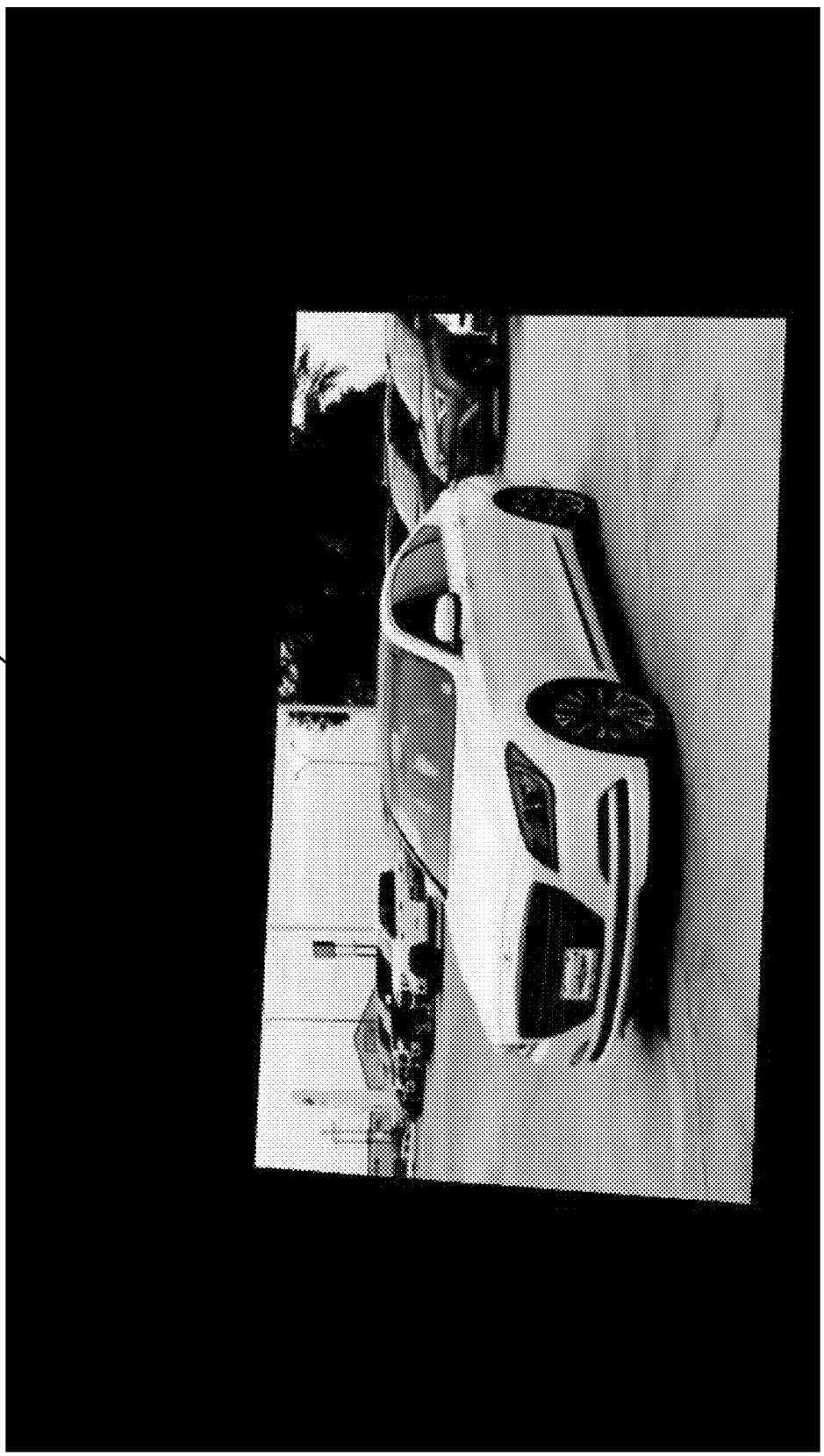
FIGS. 19, 20, 21, 22, 23, and 24 illustrate examples of visual representations constructed or analyzed in accordance with various embodiments.
Figure 20:
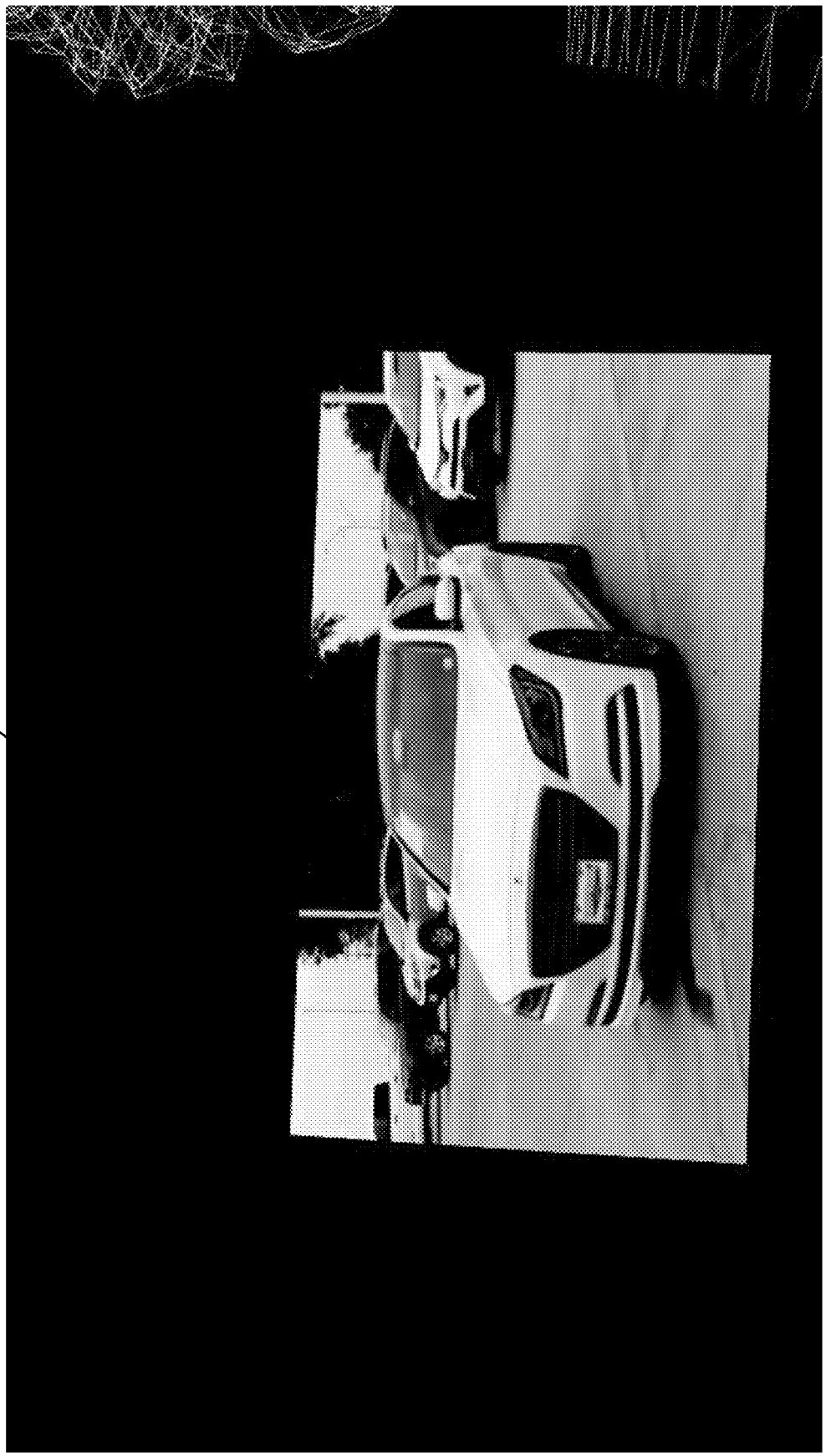

FIGS. 19, 20, 21, 22, 23, and 24 illustrate examples of visual representations constructed or analyzed in accordance with various embodiments. FIG. 19 shows an image 1902 of a vehicle included in a multi-view capture of the vehicle. FIG. 20 shows an image 2002 of the same vehicle from a different perspective. As discussed herein, a multi-view capture includes multiple images of the same object captured from different perspectives.

Figure 21:

FIG. 21 shows an image 2102 of the same vehicle from a different perspective. In FIG. 21, the vehicle is being positioned in an action shot base video. For the purpose of illustration, the action shot base video shown in FIG. 21 is of a simple virtual environment that includes a ground surface and a tree. However, as discussed herein, according to various embodiments any suitable video of a real or virtual environment may be employed.

Figure 22:
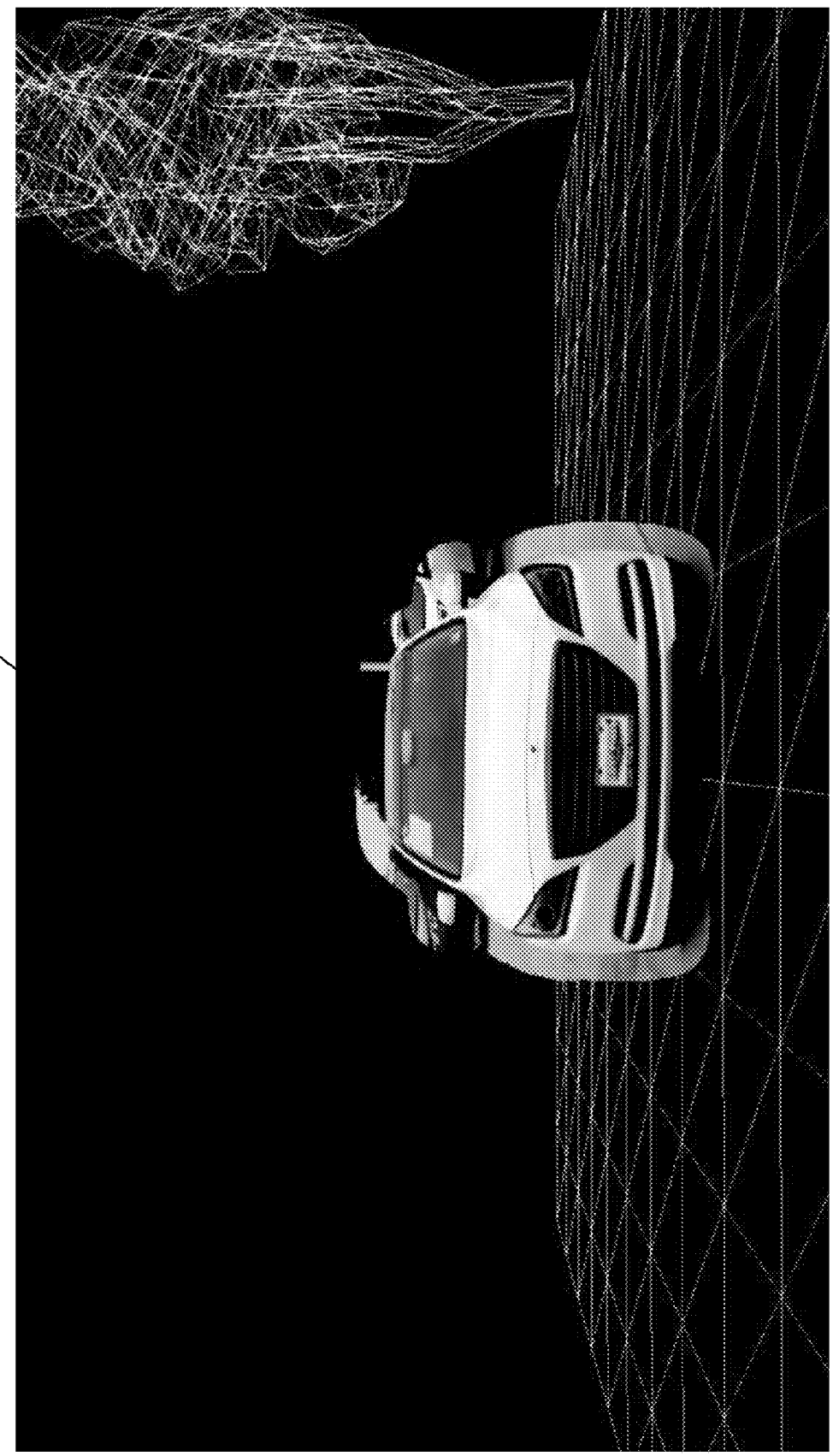

FIG. 21 also shows a transition effect, in which the background surrounding the object in the initial perspective view image shrinks until it is replaced with the action shot base video. FIG. 22 extends this effect. FIG. 22 shows an image 2202 of the same vehicle from a different perspective. In FIG. 22, the transition effect is nearing completion, since the background surrounding the object has shrunk to being nearly the size of the object itself.

Figure 23:
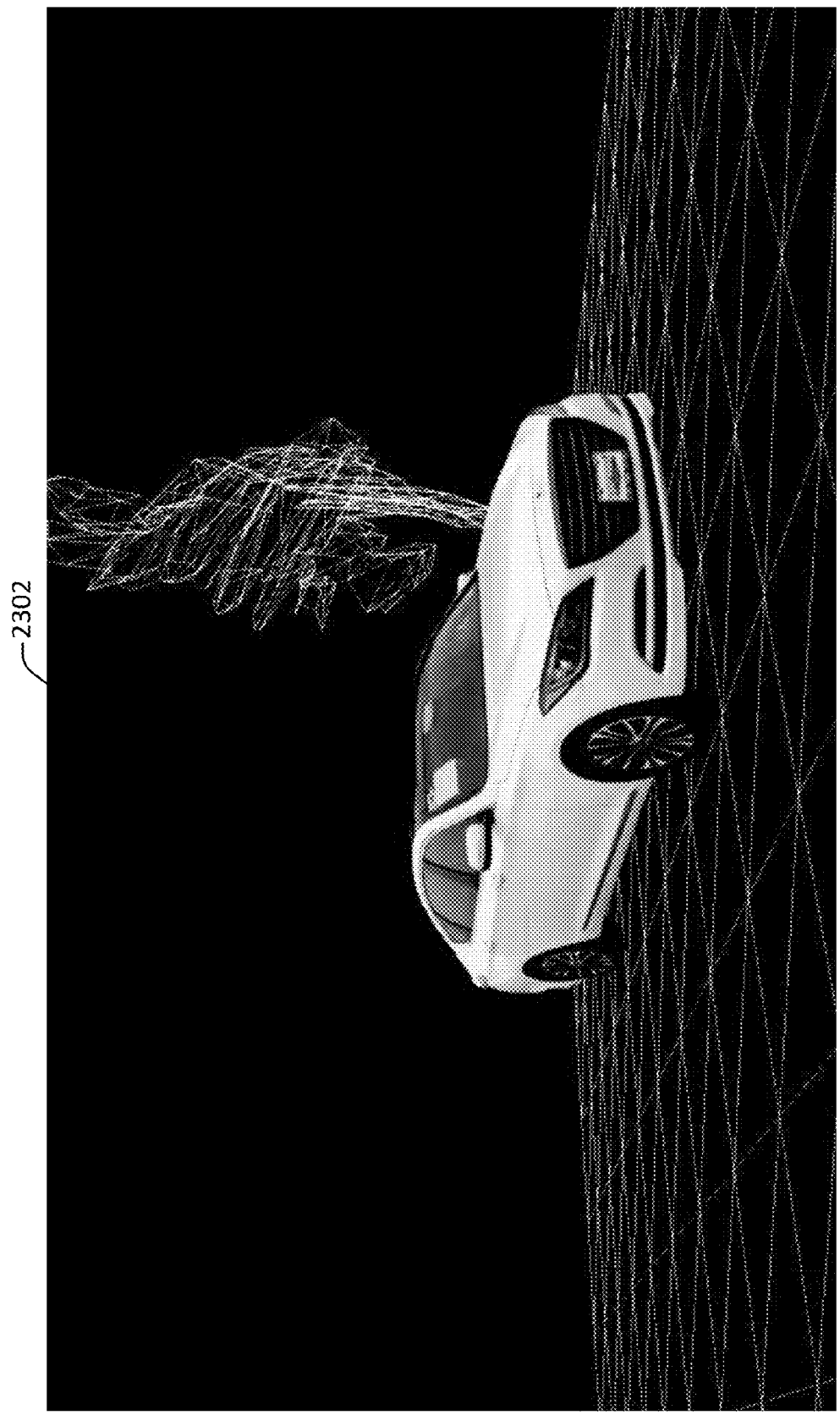

FIG. 23 shows an image 2302 of the same vehicle from a different perspective. In FIG. 23, the vehicle is positioned fully within the virtual environment. For example, the vehicle is shown as sitting on top of the ground surface and in front of a tree.

Figure 24:
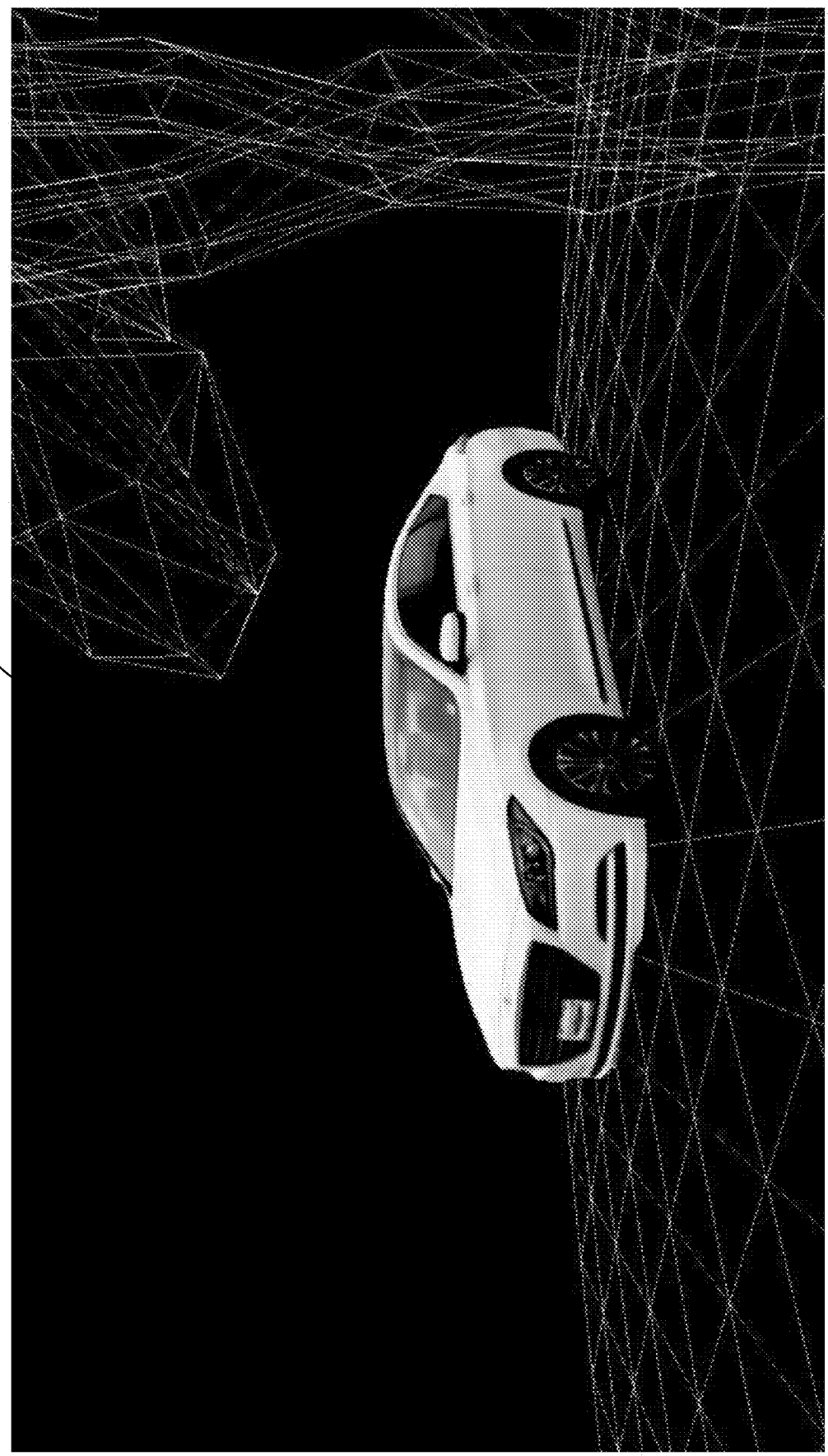

FIG. 24 shows an image 2402 of the same vehicle from a different perspective. In FIG. 24, the vehicle is positioned fully within the virtual environment. In addition, the wheels of the vehicle have been updated to show an animation effect in which they are turning. For example, the wheels of the vehicle in the image 2402 are shown as being positioned in a different rotational position than in the image 1902 shown in FIG. 19.

Figure 5:
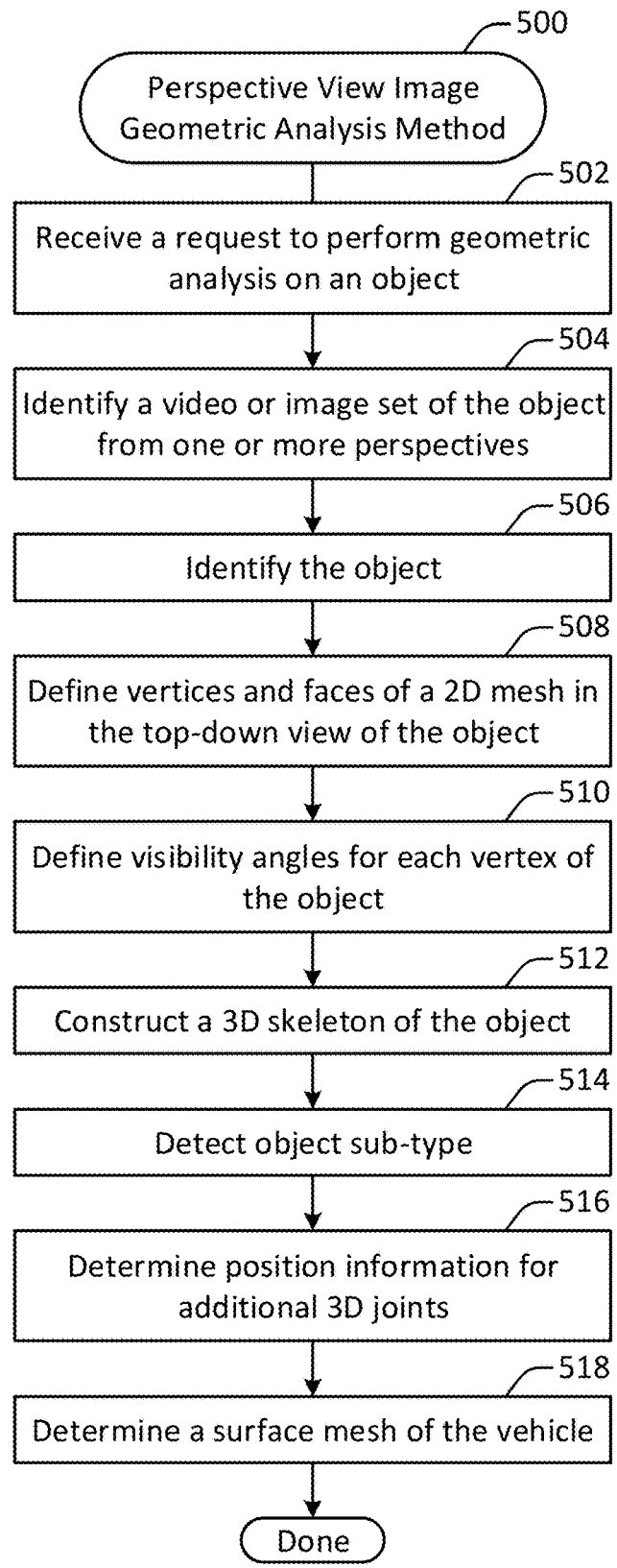
FIG. 5 illustrates one example of a method for performing geometric analysis of a perspective view image, performed in accordance with one or more embodiments.

FIG. 5 illustrates one example of a method 500 for performing geometric analysis of a perspective view image, performed in accordance with one or more embodiments. The method 500 may be performed on any suitable computing device. For example, the method 500 may be performed on a mobile computing device such as a smart phone. Alternately, or additionally, the method 500 may be performed on a remote server in communication with a mobile computing device.

A request to perform geometric analysis on an object is received at 502. According to various embodiments, the request may be received as part of a procedure for generating an action shot video. For example, the method 500 may be used to determine object pose and/or other information for an object in order to include the object within an action shot video At 504, a video or image set of the object captured from one or more perspectives is identified. The video or image set is referred to herein as "source data". According to various embodiments, the source data may include a 360-degree view of the object. Alternately, the source data may include a view that has less than 360-degree coverage.

In some embodiments, the source data may include data captured from a camera. For example, the camera may be located on a mobile computing device such a mobile phone. As another example, one or more traditional cameras may be used to capture such information.

In some implementations, the source data may include data collected from an inertial measurement unit (IMU). IMU data may include information such as camera location, camera angle, device velocity, device acceleration, or any of a wide variety of data collected from accelerometers or other such sensors.

The object is identified at 506. In some implementations, the object may be identified based on user input. For example, a user may identify the object as a vehicle or person via a user interface component such as a drop-down menu.

In some embodiments, the object may be identified based on image recognition. For example, the source data may be analyzed to determine that the subject of the source data is a vehicle, a person, or another such object. The source data may include a variety of image data. However, in case of a multi-view capture the source data focuses in a particular object from different viewpoints, the image recognition procedure may identify commonalities between the different perspective views to isolate the object that is the subject of the source data from other objects that are present in some portion of the source data but not in other portions of the source data.

At 508, vertices and faces of a 2D mesh are defined in the top-down view of the object. According to various embodiments, each face may represent a part of the object surface that could be approximated as being planar. For example, when a vehicle is captured in the source data, the vehicle's door panel or roof may be represented as a face in a 2D mesh because the door and roof are approximately planar despite being slightly curved.

In some embodiments, vertices and faces of a 2D mesh may be identified by analyzing the source data. Alternately, or additionally, the identification of the object at 206 may allow for the retrieval of a predetermined 2D mesh. For example, a vehicle object may be associated with a default 2D mesh that may be retrieved upon request.

Visibility angles are determined for each vertex of the object at 510. According to various embodiments, a visibility angle indicates the range of object angles with respect to the camera for which the vertex is visible. In some embodiments, visibility angles of a 2D mesh may be identified by analyzing the source data. Alternately, or additionally, the identification of the object at 506 may allow for the retrieval of predetermined visibility angle along with a predetermined 2D mesh. For example, a vehicle object may be associated with a default 2D mesh with associated visibility angle that may be retrieved upon request.

A 3D skeleton of the object is constructed at 512. According to various embodiments, constructing a 3D skeleton may involve any of a variety of operations. For example, 2D skeleton detection may be performed on every frame using a machine learning procedure. As another example, 3D camera pose estimation may be performed to determine a location and angle of the camera with respect to the object for a particular frame. As yet another example, a 3D skeleton may be reconstructed from 2D skeletons and or poses.

Various embodiments described herein relate generally to systems and methods for analyzing the spatial relationship between multiple images and video together with location information data, for the purpose of creating a single representation, a multi-view image digital media representation (MVIDMR, also referred to as a multi-view capture), which eliminates redundancy in the data, and presents a user with an interactive and immersive active viewing experience. According to various embodiments, active is described in the context of providing a user with the ability to control the viewpoint of the visual information displayed on a screen.

In particular example embodiments, augmented reality (AR) is used to aid a user in capturing the multiple images used in a MVIDMR. For example, a virtual guide can be inserted into live image data from a mobile. The virtual guide can help the user guide the mobile device along a desirable path useful for creating the MVIDMR. The virtual guide in the AR images can respond to movements of the mobile device. The movement of mobile device can be determined from a number of different sources, including but not limited to an Inertial Measurement Unit and image data.

Various aspects also relate generally to systems and methods for providing feedback when generating a MVIDMR. For example, object recognition may be used to recognize an object present in a MVIDMR. Then, feedback such as one or more visual indicators may be provided to guide the user in collecting additional MVIDMR data to collect a high-quality MVIDMR of the object. As another example, a target view may be determined for a MVIDMR, such as the terminal point when capturing a 360-degree MVIDMR. Then, feedback such as one or more visual indicators may be provided to guide the user in collecting additional MVIDMR data to reach the target view.

Figure 6:
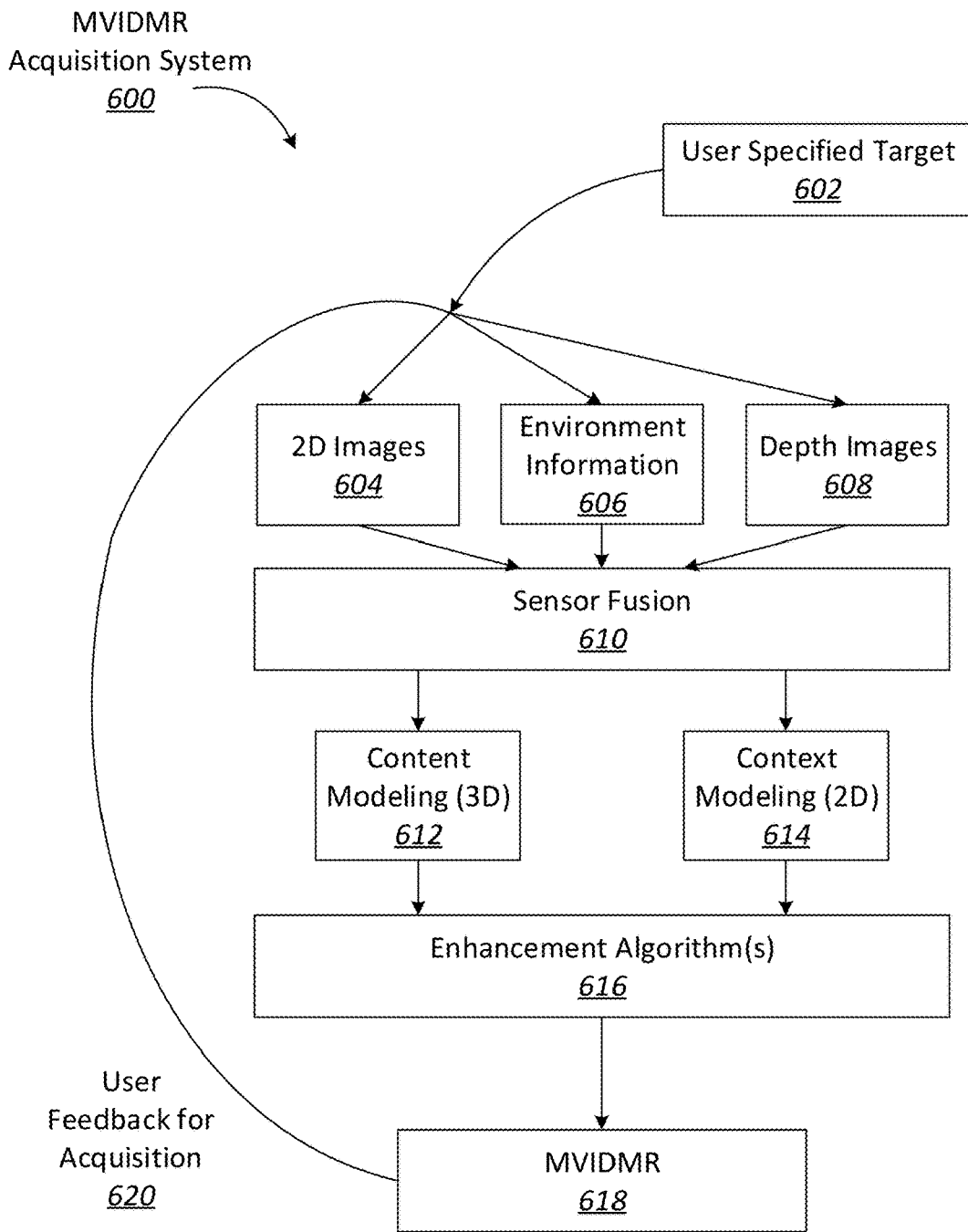
FIG. 6 illustrates an example of a multi-view image digital media representation (MVIDMR) acquisition system, configured in accordance with one or more embodiments.

FIG. 6 shows and example of a MVIDMR acquisition system 600, configured in accordance with one or more embodiments. The MVIDMR acquisition system 600 is depicted in a flow sequence that can be used to generate a MVIDMR. According to various embodiments, the data used to generate a MVIDMR can come from a variety of sources.

In particular, data such as, but not limited to two-dimensional (2D) images 604 can be used to generate a MVIDMR. These 2D images can include color image data streams such as multiple image sequences, video data, etc., or multiple images in any of various formats for images, depending on the application. As will be described in more detail below with respect to FIGS. 7A-11B, during an image capture process, an AR system can be used. The AR system can receive and augment live image data with virtual data. In particular, the virtual data can include guides for helping a user direct the motion of an image capture device.

Another source of data that can be used to generate a MVIDMR includes environment information 606. This environment information 606 can be obtained from sources such as accelerometers, gyroscopes, magnetometers, GPS, WiFi, IMU-like systems (Inertial Measurement Unit systems), and the like. Yet another source of data that can be used to generate a MVIDMR can include depth images 608. These depth images can include depth, 3D, or disparity image data streams, and the like, and can be captured by devices such as, but not limited to, stereo cameras, time-of-flight cameras, three-dimensional cameras, and the like.

In some embodiments, the data can then be fused together at sensor fusion block 610. In some embodiments, a MVIDMR can be generated a combination of data that includes both 2D images 604 and environment information 606, without any depth images 608 provided. In other embodiments, depth images 608 and environment information 606 can be used together at sensor fusion block 610. Various combinations of image data can be used with environment information at 606, depending on the application and available data.

In some embodiments, the data that has been fused together at sensor fusion block 610 is then used for content modeling 612 and context modeling 614. As described in more detail with regard to FIG. 9, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments, as described in more detail below with regard to FIG. 9. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 612 and context modeling 614 can be generated by combining the image and location information data, as described in more detail with regard to FIG. 8.

According to various embodiments, context and content of a MVIDMR are determined based on a specified object of interest. In some embodiments, an object of interest is automatically chosen based on processing of the image and location information data. For instance, if a dominant object is detected in a series of images, this object can be selected as the content. In other examples, a user specified target 602 can be chosen, as shown in FIG. 6. It should be noted, however, that a MVIDMR can be generated without a user-specified target in some applications.

In some embodiments, one or more enhancement algorithms can be applied at enhancement algorithm(s) block 616. In particular example embodiments, various algorithms can be employed during capture of MVIDMR data, regardless of the type of capture mode employed. These algorithms can be used to enhance the user experience. For instance, automatic frame selection, stabilization, view interpolation, filters, and/or compression can be used during capture of MVIDMR data. In some embodiments, these enhancement algorithms can be applied to image data after acquisition of the data. In other examples, these enhancement algorithms can be applied to image data during capture of MVIDMR data.

According to various embodiments, automatic frame selection can be used to create a more enjoyable MVIDMR. Specifically, frames are automatically selected so that the transition between them will be smoother or more even. This automatic frame selection can incorporate blur- and over-exposure-detection in some applications, as well as more uniformly sampling poses such that they are more evenly distributed.

In some embodiments, stabilization can be used for a MVIDMR in a manner similar to that used for video. In particular, keyframes in a MVIDMR can be stabilized for to produce improvements such as smoother transitions, improved/enhanced focus on the content, etc. However, unlike video, there are many additional sources of stabilization for a MVIDMR, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some embodiments, depth information, if available, can be used to provide stabilization for a MVIDMR. Because points of interest in a MVIDMR are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. According to various embodiments, the content can stay relatively stable/visible even when the context changes.

According to various embodiments, computer vision techniques can also be used to provide stabilization for MVIDMRs. For instance, keypoints can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because a MVIDMR is often focused on a particular object of interest, a MVIDMR can be content-weighted so that the object of interest is maximally stabilized in some examples.

Another way to improve stabilization in a MVIDMR includes direct selection of a region of a screen. For instance, if a user taps to focus on a region of a screen, then records a convex MVIDMR, the area that was tapped can be maximally stabilized. This allows stabilization algorithms to be focused on a particular area or object of interest.

In some embodiments, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, and mouth) can be used as areas to stabilize, rather than using generic keypoints. In another example, a user can select an area of image to use as a source for keypoints.

According to various embodiments, view interpolation can be used to improve the viewing experience. In particular, to avoid sudden "jumps" between stabilized frames, synthetic, intermediate views can be rendered on the fly. This can be informed by content-weighted keypoint tracks and IMU information as described above, as well as by denser pixel-to-pixel matches. If depth information is available, fewer artifacts resulting from mismatched pixels may occur, thereby simplifying the process. As described above, view interpolation can be applied during capture of a MVIDMR in some embodiments. In other embodiments, view interpolation can be applied during MVIDMR generation.

In some embodiments, filters can also be used during capture or generation of a MVIDMR to enhance the viewing experience. Just as many popular photo sharing services provide aesthetic filters that can be applied to static, two-dimensional images, aesthetic filters can similarly be applied to surround images. However, because a MVIDMR representation is more expressive than a two-dimensional image, and three-dimensional information is available in a MVIDMR, these filters can be extended to include effects that are ill-defined in two dimensional photos. For instance, in a MVIDMR, motion blur can be added to the background (i.e. context) while the content remains crisp. In another example, a drop-shadow can be added to the object of interest in a MVIDMR.

According to various embodiments, compression can also be used as an enhancement algorithm 616. In particular, compression can be used to enhance user-experience by reducing data upload and download costs. Because MVIDMRs use spatial information, far less data can be sent for a MVIDMR than a typical video, while maintaining desired qualities of the MVIDMR. Specifically, the IMU, keypoint tracks, and user input, combined with the view interpolation described above, can all reduce the amount of data that must be transferred to and from a device during upload or download of a MVIDMR. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a MVIDMR 618 is generated after any enhancement algorithms are applied. The MVIDMR can provide a multi-view interactive digital media representation. According to various embodiments, the MVIDMR can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, MVIDMRs provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with MVIDMRs that allow the MVIDMRs to be indexed with a high degree of efficiency and accuracy; and the ability of the user to interact and change the viewpoint of the MVIDMR. In particular example embodiments, the characteristics described above can be incorporated natively in the MVIDMR representation, and provide the capability for use in various applications. For instance, MVIDMRs can be used to enhance various fields such as e-commerce, visual search, 3D printing, file sharing, user interaction, and entertainment.

According to various example embodiments, once a MVIDMR 618 is generated, user feedback for acquisition 620 of additional image data can be provided. In particular, if a MVIDMR is determined to need additional views to provide a more accurate model of the content or context, a user may be prompted to provide additional views. Once these additional views are received by the MVIDMR acquisition system 600, these additional views can be processed by the system 600 and incorporated into the MVIDMR.

Figure 7:
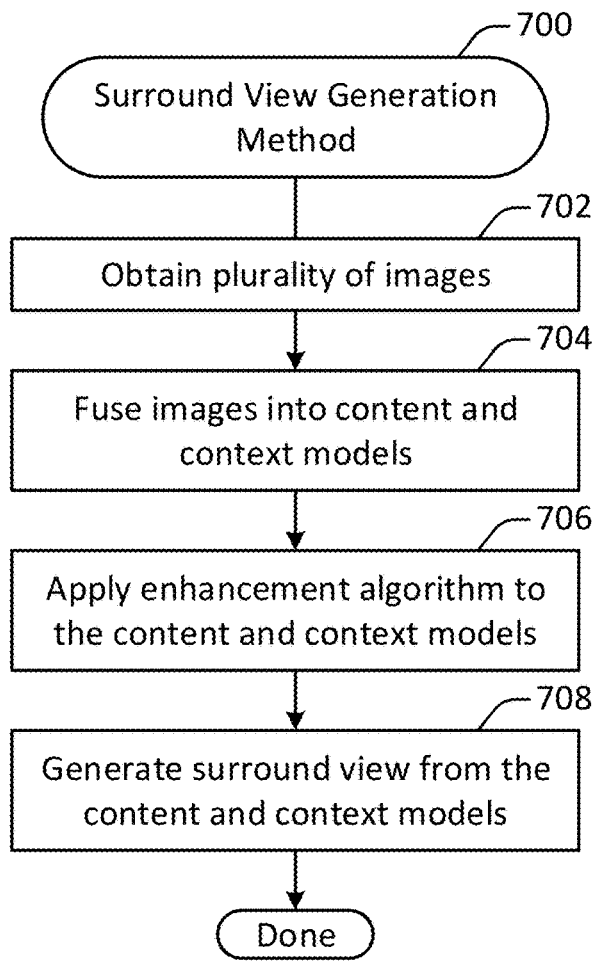
FIG. 7 illustrates one example of a method for generating a MVIDMR, performed in accordance with one or more embodiments.

FIG. 7 shows an example of a process flow diagram for generating a MVIDMR 700. In the present example, a plurality of images is obtained at 702. According to various embodiments, the plurality of images can include two-dimensional (2D) images or data streams. These 2D images can include location information that can be used to generate a MVIDMR. In some embodiments, the plurality of images can include depth images 608, as also described above with regard to FIG. 6. The depth images can also include location information in various examples.

In some embodiments, when the plurality of images is captured, images output to the user can be augmented with the virtual data. For example, the plurality of images can be captured using a camera system on a mobile device. The live image data, which is output to a display on the mobile device, can include virtual data, such as guides and status indicators, rendered into the live image data. The guides can help a user guide a motion of the mobile device. The status indicators can indicate what portion of images needed for generating a MVIDMR have been captured. The virtual data may not be included in the image data captured for the purposes of generating the MVIDMR.

According to various embodiments, the plurality of images obtained at 702 can include a variety of sources and characteristics. For instance, the plurality of images can be obtained from a plurality of users. These images can be a collection of images gathered from the internet from different users of the same event, such as 2D images or video obtained at a concert, etc. In some embodiments, the plurality of images can include images with different temporal information. In particular, the images can be taken at different times of the same object of interest. For instance, multiple images of a particular statue can be obtained at different times of day, different seasons, etc. In other examples, the plurality of images can represent moving objects. For instance, the images may include an object of interest moving through scenery, such as a vehicle traveling along a road or a plane traveling through the sky. In other instances, the images may include an object of interest that is also moving, such as a person dancing, running, twirling, etc.

In some embodiments, the plurality of images is fused into content and context models at 704. According to various embodiments, the subject matter featured in the images can be separated into content and context. The content can be delineated as the object of interest and the context can be delineated as the scenery surrounding the object of interest. According to various embodiments, the content can be a three-dimensional model, depicting an object of interest, and the content can be a two-dimensional image in some embodiments.

According to the present example embodiment, one or more enhancement algorithms can be applied to the content and context models at 706. These algorithms can be used to enhance the user experience. For instance, enhancement algorithms such as automatic frame selection, stabilization, view interpolation, filters, and/or compression can be used. In some embodiments, these enhancement algorithms can be applied to image data during capture of the images. In other examples, these enhancement algorithms can be applied to image data after acquisition of the data.

In the present embodiment, a MVIDMR is generated from the content and context models at 708. The MVIDMR can provide a multi-view interactive digital media representation. According to various embodiments, the MVIDMR can include a three-dimensional model of the content and a two-dimensional model of the context. According to various embodiments, depending on the mode of capture and the viewpoints of the images, the MVIDMR model can include certain characteristics. For instance, some examples of different styles of MVIDMRs include a locally concave MVIDMR, a locally convex MVIDMR, and a locally flat MVIDMR. However, it should be noted that MVIDMRs can include combinations of views and characteristics, depending on the application.

Figure 8:
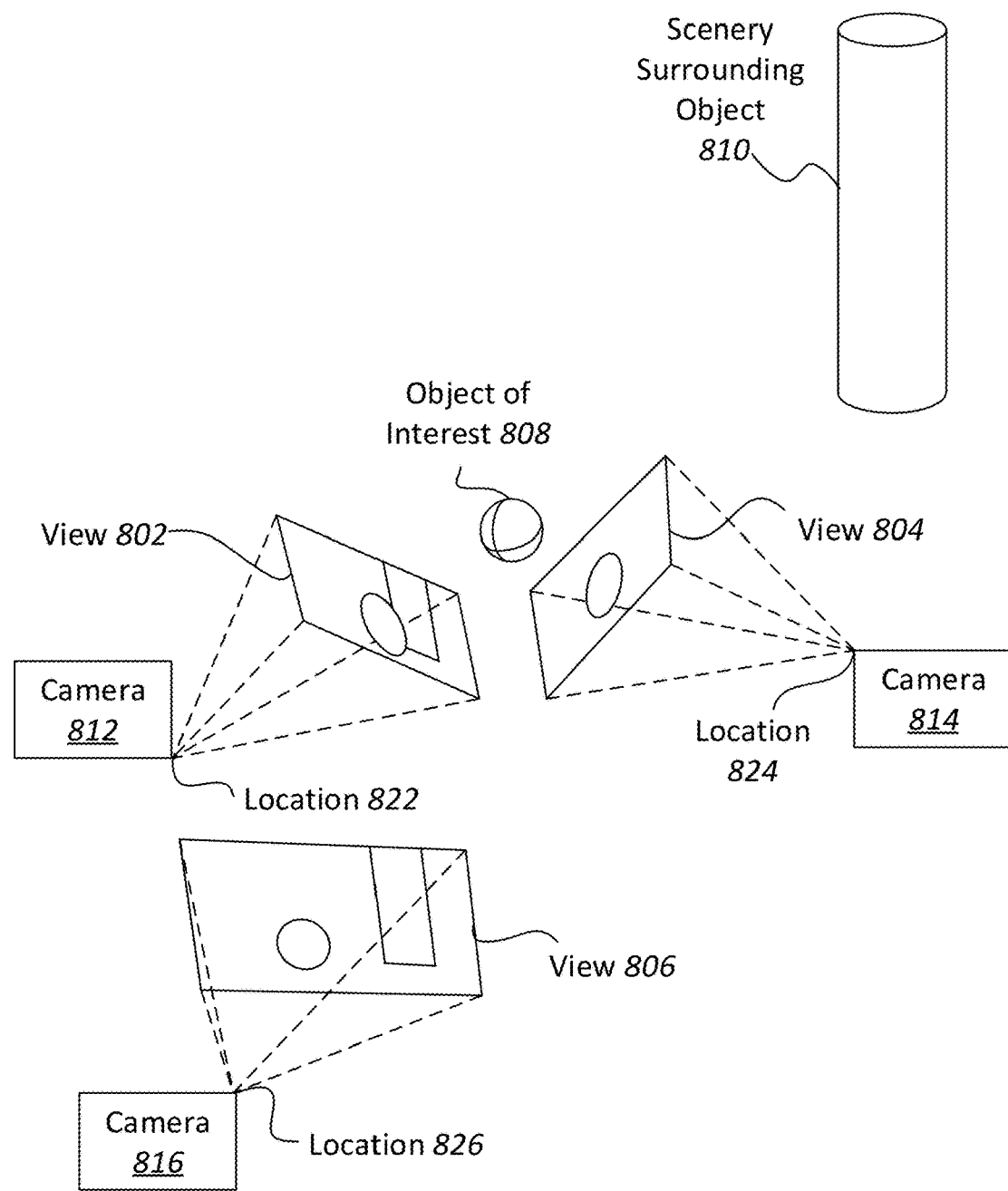
FIG. 8 illustrates one example of multiple camera views fused together into a three-dimensional (3D) model.

FIG. 8 shows an example of multiple camera views that can be fused together into a three-dimensional (3D) model to create an immersive experience. According to various embodiments, multiple images can be captured from various viewpoints and fused together to provide a MVIDMR. In some embodiments, three cameras 812, 814, and 816 are positioned at locations 822, 824, and 826, respectively, in proximity to an object of interest 808. Scenery can surround the object of interest 808 such as object 810. Views 802, 804, and 806 from their respective cameras 812, 814, and 816 include overlapping subject matter. Specifically, each view 802, 804, and 806 includes the object of interest 808 and varying degrees of visibility of the scenery surrounding the object 810. For instance, view 802 includes a view of the object of interest 808 in front of the cylinder that is part of the scenery surrounding the object 810. View 806 shows the object of interest 808 to one side of the cylinder, and view 804 shows the object of interest without any view of the cylinder.

In some embodiments, the various views 802, 804, and 816 along with their associated locations 822, 824, and 826, respectively, provide a rich source of information about object of interest 808 and the surrounding context that can be used to produce a MVIDMR. For instance, when analyzed together, the various views 802, 804, and 826 provide information about different sides of the object of interest and the relationship between the object of interest and the scenery. According to various embodiments, this information can be used to parse out the object of interest 808 into content and the scenery as the context. Furthermore, various algorithms can be applied to images produced by these viewpoints to create an immersive, interactive experience when viewing a MVIDMR.

Figure 9:
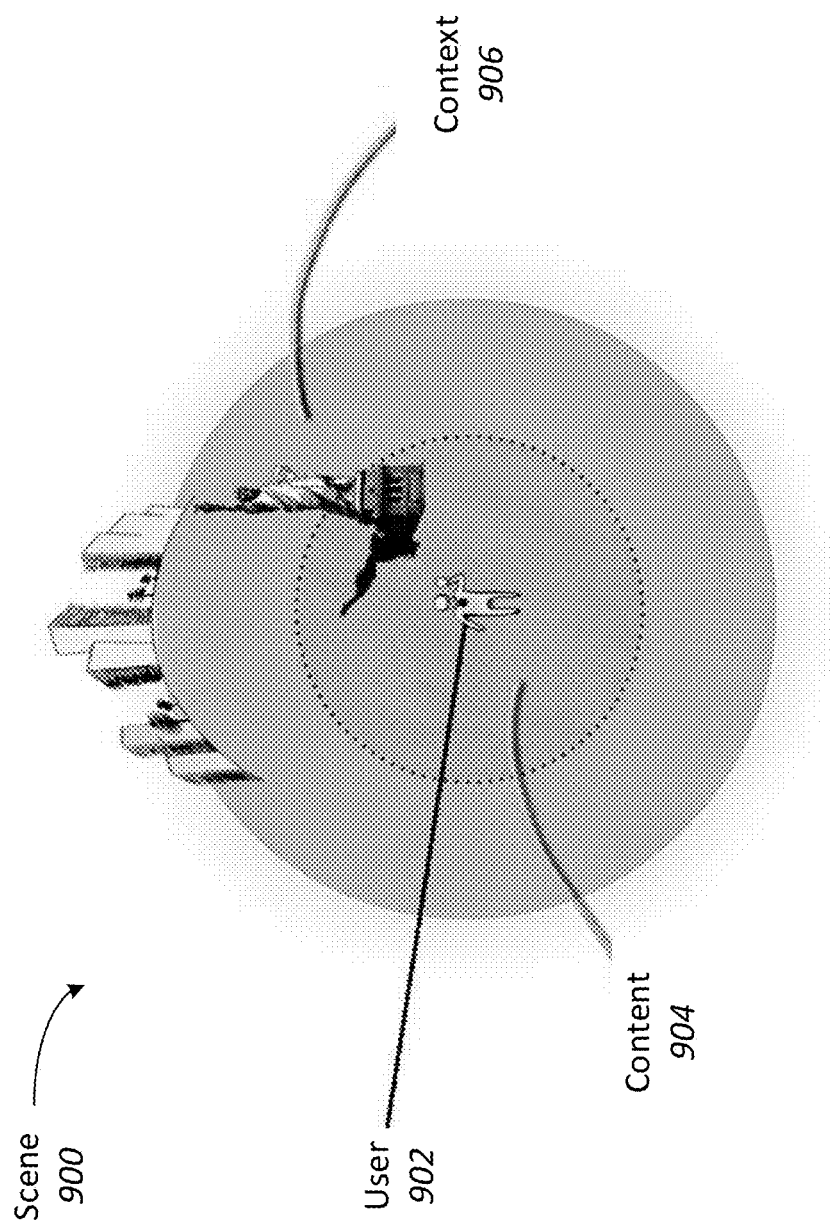
FIG. 9 illustrates one example of separation of content and context in a MVIDMR.

FIG. 9 illustrates one example of separation of content and context in a MVIDMR. According to various embodiments, a MVIDMR is a multi-view interactive digital media representation of a scene 900. With reference to FIG. 9, shown is a user 902 located in a scene 900. The user 902 is capturing images of an object of interest, such as a statue. The images captured by the user constitute digital visual data that can be used to generate a MVIDMR.

According to various embodiments of the present disclosure, the digital visual data included in a MVIDMR can be, semantically and/or practically, separated into content 904 and context 906. According to particular embodiments, content 904 can include the object(s), person(s), or scene(s) of interest while the context 906 represents the remaining elements of the scene surrounding the content 904. In some embodiments, a MVIDMR may represent the content 904 as three-dimensional data, and the context 906 as a two-dimensional panoramic background. In other examples, a MVIDMR may represent both the content 904 and context 906 as two-dimensional panoramic scenes. In yet other examples, content 904 and context 906 may include three-dimensional components or aspects. In particular embodiments, the way that the MVIDMR depicts content 904 and context 906 depends on the capture mode used to acquire the images.

In some embodiments, such as but not limited to: recordings of objects, persons, or parts of objects or persons, where only the object, person, or parts of them are visible, recordings of large flat areas, and recordings of scenes where the data captured appears to be at infinity (i.e., there are no subjects close to the camera), the content 904 and the context 906 may be the same. In these examples, the MVIDMR produced may have some characteristics that are similar to other types of digital media such as panoramas. However, according to various embodiments, MVIDMRs include additional features that distinguish them from these existing types of digital media. For instance, a MVIDMR can represent moving data. Additionally, a MVIDMR is not limited to a specific cylindrical, spherical or translational movement. Various motions can be used to capture image data with a camera or other capture device. Furthermore, unlike a stitched panorama, a MVIDMR can display different sides of the same object.

Figures 10A, 10B:
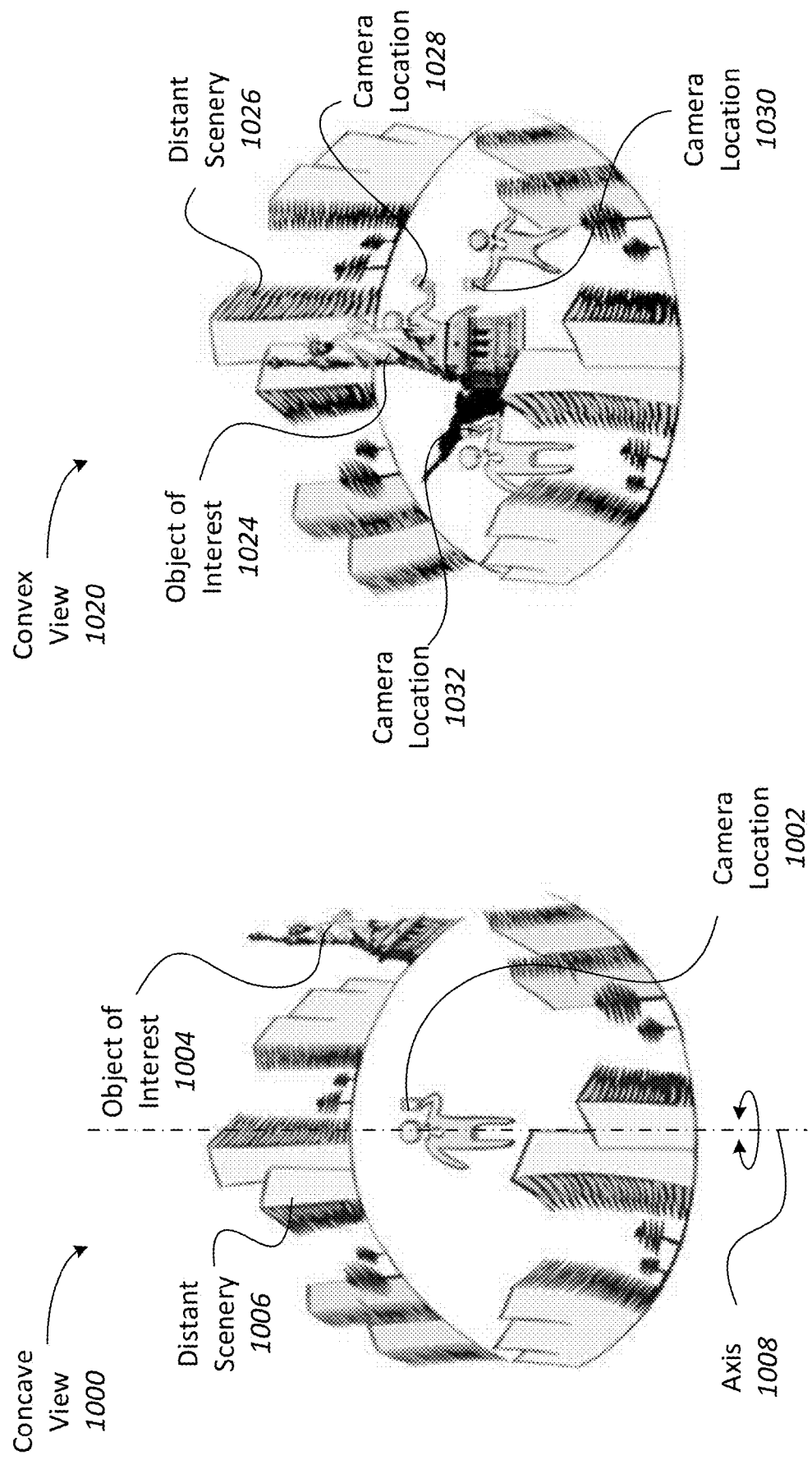
FIGS. 10A-10B illustrate examples of concave and convex views, where both views use a back-camera capture style.

FIGS. 10A-10E3 illustrate examples of concave and convex views, respectively, where both views use a back-camera capture style. In particular, if a camera phone is used, these views use the camera on the back of the phone, facing away from the user. In particular embodiments, concave and convex views can affect how the content and context are designated in a MVIDMR.

With reference to FIG. 10A, shown is one example of a concave view 1000 in which a user is standing along a vertical axis 1008. In this example, the user is holding a camera, such that camera location 1002 does not leave axis 1008 during image capture. However, as the user pivots about axis 1008, the camera captures a panoramic view of the scene around the user, forming a concave view. In this embodiment, the object of interest 1004 and the distant scenery 1006 are all viewed similarly because of the way in which the images are captured. In this example, all objects in the concave view appear at infinity, so the content is equal to the context according to this view.

With reference to FIG. 10B, shown is one example of a convex view 1020 in which a user changes position when capturing images of an object of interest 1024. In this example, the user moves around the object of interest 1024, taking pictures from different sides of the object of interest from camera locations 1028, 1030, and 1032. Each of the images obtained includes a view of the object of interest, and a background of the distant scenery 1026. In the present example, the object of interest 1024 represents the content, and the distant scenery 1026 represents the context in this convex view.

Figure 11A:
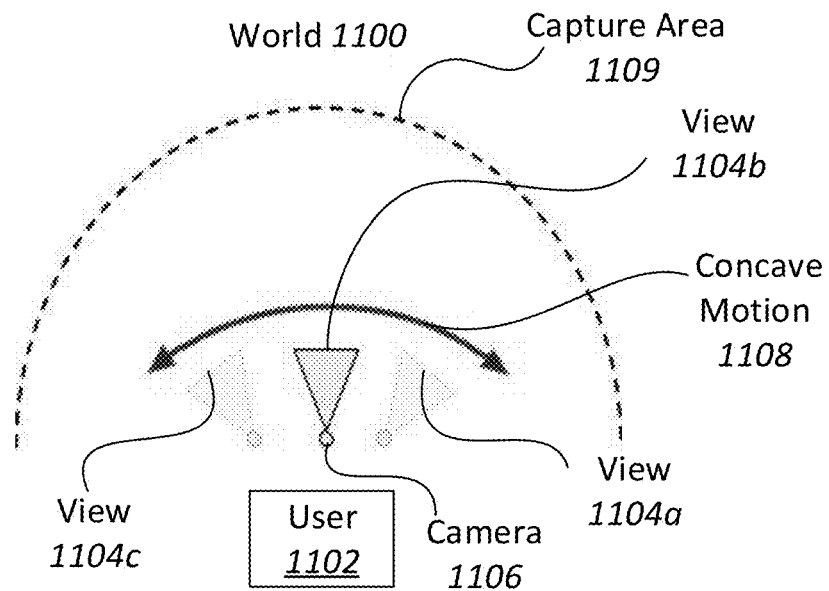
FIGS. 11A-11B illustrates one example of a back-facing, concave MVIDMR, generated in accordance with one or more embodiments.
Figure 11B:
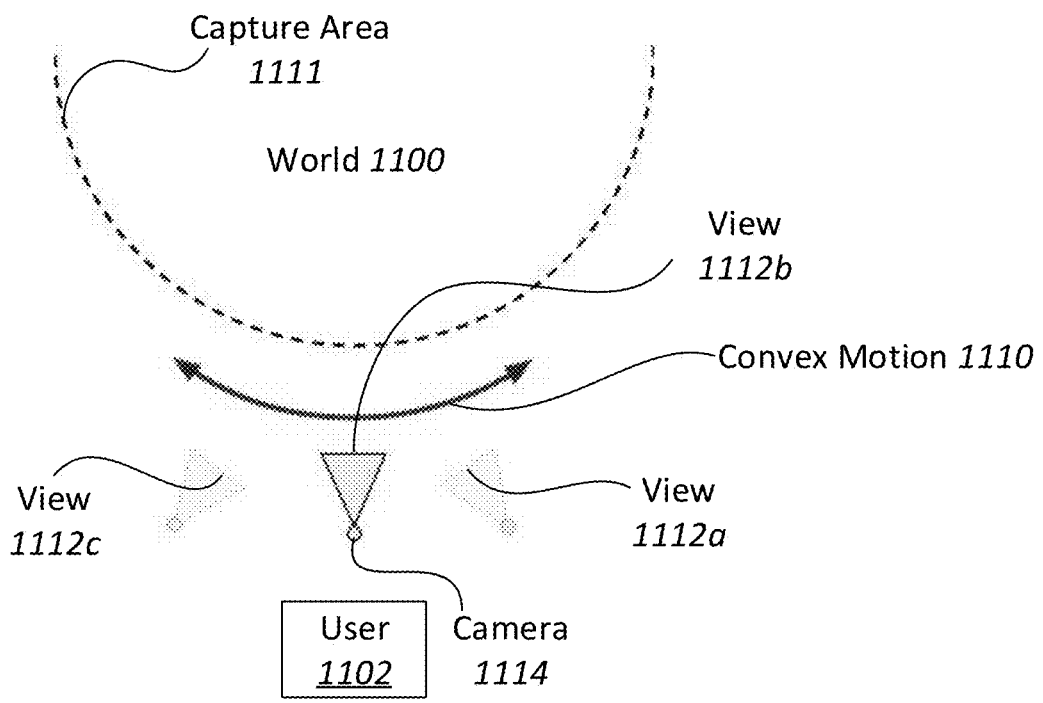

FIGS. 11A-11B illustrate examples of various capture modes for MVIDMRs. Although various motions can be used to capture a MVIDMR and are not constrained to any particular type of motion, three general types of motion can be used to capture particular features or views described in conjunction MVIDMRs. These three types of motion, respectively, can yield a locally concave MVIDMR, a locally convex MVIDMR, and a locally flat MVIDMR. In some embodiments, a MVIDMR can include various types of motions within the same MVIDMR.

With reference to FIG. 11A, shown is an example of a back-facing, concave MVIDMR being captured. According to various embodiments, a locally concave MVIDMR is one in which the viewing angles of the camera or other capture device diverge. In one dimension this can be likened to the motion required to capture a spherical 360 panorama (pure rotation), although the motion can be generalized to any curved sweeping motion in which the view faces outward. In the present example, the experience is that of a stationary viewer looking out at a (possibly dynamic) context.

In some embodiments, a user 1102 is using a back-facing camera 1106 to capture images towards world 1100, and away from user 1102. As described in various examples, a back-facing camera refers to a device with a camera that faces away from the user, such as the camera on the back of a smart phone. The camera is moved in a concave motion 1108, such that views 1104a, 1104b, and 1104c capture various parts of capture area 1109.

With reference to FIG. 11B, shown is an example of a back-facing, convex MVIDMR being captured. According to various embodiments, a locally convex MVIDMR is one in which viewing angles converge toward a single object of interest. In some embodiments, a locally convex MVIDMR can provide the experience of orbiting about a point, such that a viewer can see multiple sides of the same object. This object, which may be an "object of interest," can be segmented from the MVIDMR to become the content, and any surrounding data can be segmented to become the context. Previous technologies fail to recognize this type of viewing angle in the media-sharing landscape.

In some embodiments, a user 1102 is using a back-facing camera 1114 to capture images towards world 1100, and away from user 1102. The camera is moved in a convex motion 1110, such that views 1112a, 1112b, and 1112c capture various parts of capture area 1111. As described above, world 1100 can include an object of interest in some examples, and the convex motion 1110 can orbit around this object. Views 1112a, 1112b, and 1112c can include views of different sides of this object in these examples.

Figure 12A:
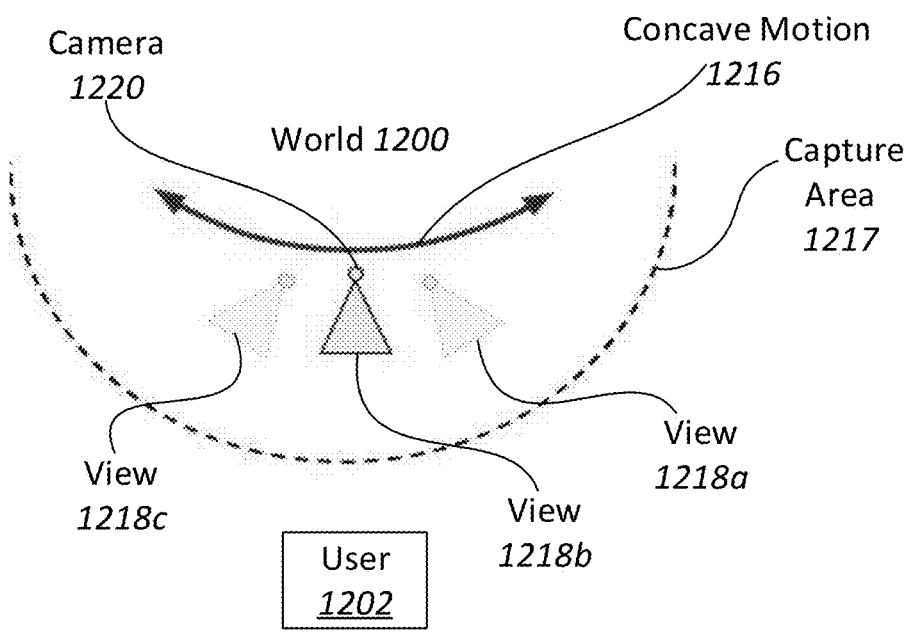
FIGS. 12A-12B illustrate examples of front-facing, concave and convex MVIDMRs generated in accordance with one or more embodiments.

With reference to FIG. 12A, shown is an example of a front-facing, concave MVIDMR being captured. As described in various examples, a front-facing camera refers to a device with a camera that faces towards the user, such as the camera on the front of a smart phone. For instance, front-facing cameras are commonly used to take "selfies" (i.e., self-portraits of the user).

In some embodiments, camera 1220 is facing user 1202. The camera follows a concave motion 1206 such that the views 1218a, 1218b, and 1218c diverge from each other in an angular sense. The capture area 1217 follows a concave shape that includes the user at a perimeter.

Figure 12B:
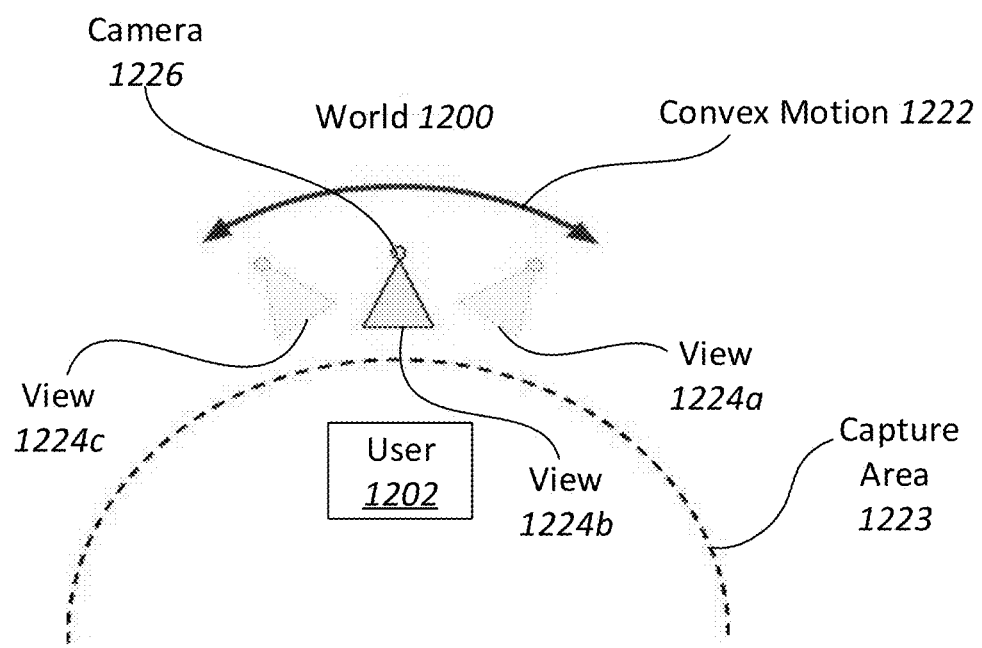

With reference to FIG. 12B, shown is an example of a front-facing, convex MVIDMR being captured. In some embodiments, camera 1226 is facing user 1202. The camera follows a convex motion 1222 such that the views 1224a, 1224b, and 1224c converge towards the user 1202. As described above, various modes can be used to capture images for a MVIDMR. These modes, including locally concave, locally convex, and locally linear motions, can be used during capture of separate images or during continuous recording of a scene. Such recording can capture a series of images during a single session.

In some embodiments, the augmented reality system can be implemented on a mobile device, such as a cell phone. In particular, the live camera data, which is output to a display on the mobile device, can be augmented with virtual objects. The virtual objects can be rendered into the live camera data. In some embodiments, the virtual objects can provide a user feedback when images are being captured for a MVIDMR.

Figure 13:
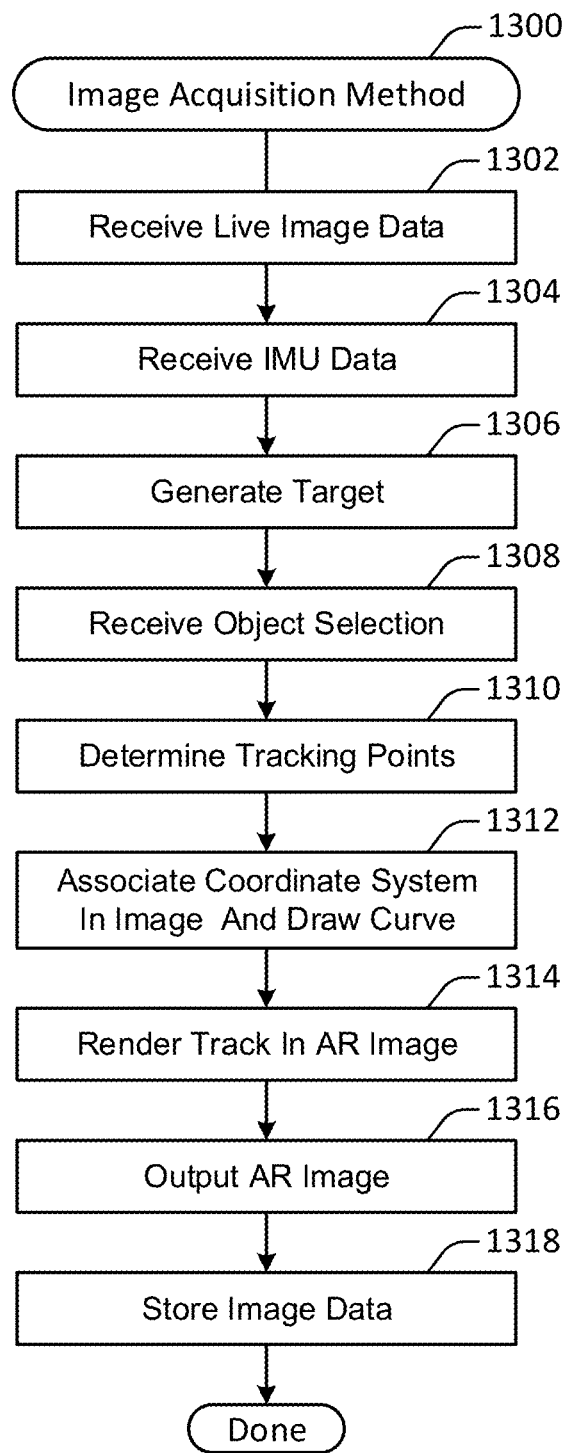
FIG. 13 illustrates one example of a method for generating virtual data associated with a target using live image data, performed in accordance with one or more embodiments.
Figure 14:
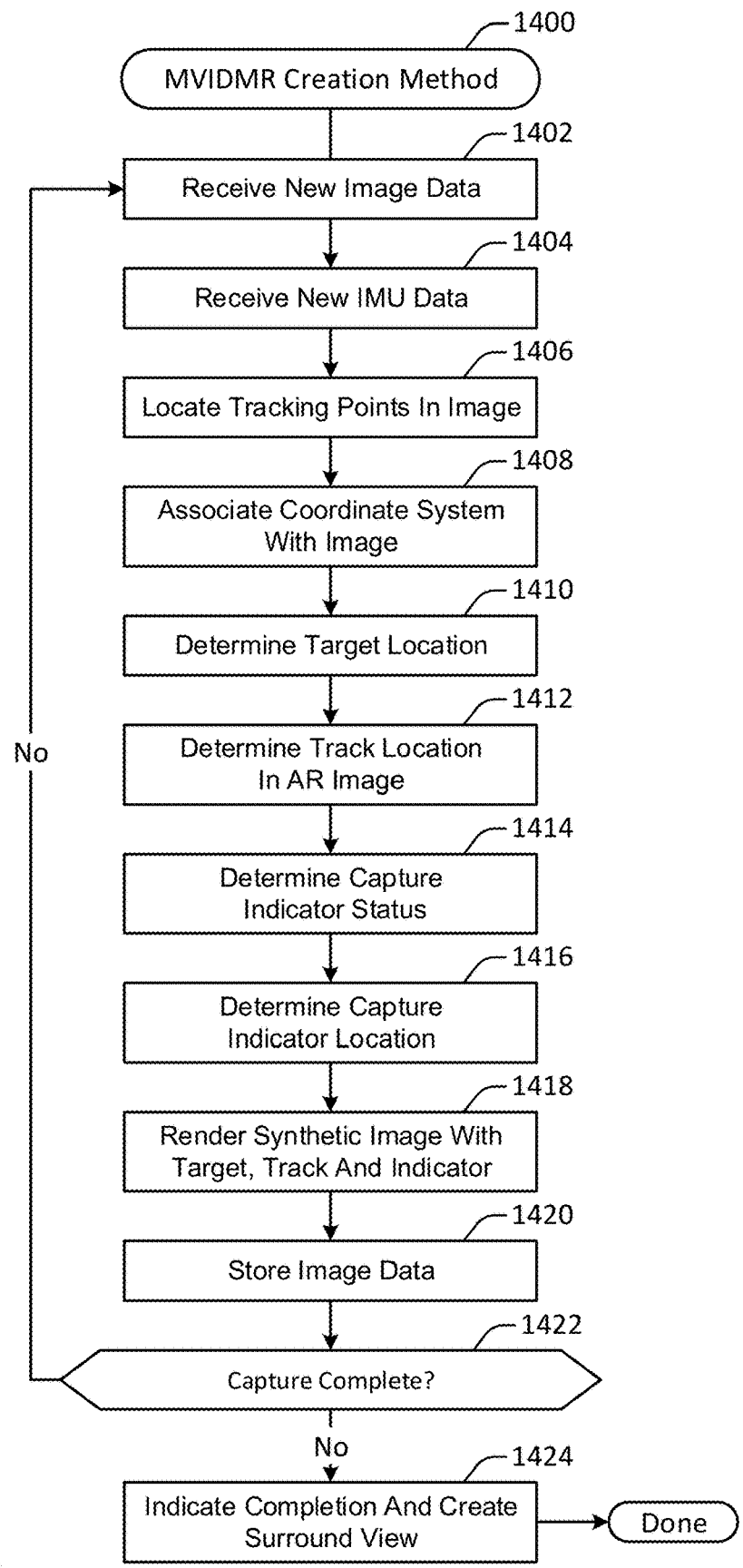
FIG. 14 illustrates one example of a method for generating MVIDMRs, performed in accordance with one or more embodiments.

FIGS. 13 and 14 illustrate an example of a process flow for capturing images in a MVIDMR using augmented reality. In 1302, live image data can be received from a camera system. For example, live image data can be received from one or more cameras on a hand-held mobile device, such as a smartphone. The image data can include pixel data captured from a camera sensor. The pixel data varies from frame to frame. In some embodiments, the pixel data can be 2-D. In other embodiments, depth data can be included with the pixel data.

In 1304, sensor data can be received. For example, the mobile device can include an IMU with accelerometers and gyroscopes. The sensor data can be used to determine an orientation of the mobile device, such as a tilt orientation of the device relative to the gravity vector. Thus, the orientation of the live 2-D image data relative to the gravity vector can also be determined. In addition, when the user applied accelerations can be separated from the acceleration due to gravity, it may be possible to determine changes in position of the mobile device as a function of time.

In particular embodiments, a camera reference frame can be determined. In the camera reference frame, one axis is aligned with a line perpendicular to the camera lens. Using an accelerometer on the phone, the camera reference frame can be related to an Earth reference frame. The earth reference frame can provide a 3-D coordinate system where one of the axes is aligned with the Earths' gravitational vector. The relationship between the camera frame and Earth reference frame can be indicated as yaw, roll and tilt/pitch. Typically, at least two of the three of yaw, roll and pitch are available typically from sensors available on a mobile device, such as smart phone's gyroscopes and accelerometers.

The combination of yaw-roll-tilt information from the sensors, such as a smart phone or tablets accelerometers and the data from the camera including the pixel data can be used to relate the 2-D pixel arrangement in the camera field of view to the 3-D reference frame in the real world. In some embodiments, the 2-D pixel data for each picture can be translated to a reference frame as if the camera where resting on a horizontal plane perpendicular to an axis through the gravitational center of the Earth where a line drawn through the center of lens perpendicular to the surface of lens is mapped to a center of the pixel data. This reference frame can be referred as an Earth reference frame. Using this calibration of the pixel data, a curve or object defined in 3-D space in the earth reference frame can be mapped to a plane associated with the pixel data (2-D pixel data). If depth data is available, i.e., the distance of the camera to a pixel. Then, this information can also be utilized in a transformation.

In alternate embodiments, the 3-D reference frame in which an object is defined doesn't have to be an Earth reference frame. In some embodiments, a 3-D reference in which an object is drawn and then rendered into the 2-D pixel frame of reference can be defined relative to the Earth reference frame. In another embodiment, a 3-D reference frame can be defined relative to an object or surface identified in the pixel data and then the pixel data can be calibrated to this 3-D reference frame.

As an example, the object or surface can be defined by a number of tracking points identified in the pixel data. Then, as the camera moves, using the sensor data and a new position of the tracking points, a change in the orientation of the 3-D reference frame can be determined from frame to frame. This information can be used to render virtual data in a live image data and/or virtual data into a MVIDMR.

Returning to FIG. 13, in 1306, virtual data associated with a target can be generated in the live image data. For example, the target can be cross hairs. In general, the target can be rendered as any shape or combinations of shapes. In some embodiments, via an input interface, a user may be able to adjust a position of the target. For example, using a touch screen over a display on which the live image data is output, the user may be able to place the target at a particular location in the synthetic image. The synthetic image can include a combination of live image data rendered with one or more virtual objects.

For example, the target can be placed over an object that appears in the image, such as a face or a person. Then, the user can provide an additional input via an interface that indicates the target is in a desired location. For example, the user can tap the touch screen proximate to the location where the target appears on the display. Then, an object in the image below the target can be selected. As another example, a microphone in the interface can be used to receive voice commands which direct a position of the target in the image (e.g., move left, move right, etc.) and then confirm when the target is in a desired location (e.g., select target).

In some instances, object recognition can be available. Object recognition can identify possible objects in the image. Then, the live images can be augmented with a number of indicators, such as targets, which mark identified objects. For example, objects, such as people, parts of people (e.g., faces), cars, wheels, can be marked in the image. Via an interface, the person may be able to select one of the marked objects, such as via the touch screen interface. In another embodiment, the person may be able to provide a voice command to select an object. For example, the person may be to say something like "select face," or "select car."

In 1308, the object selection can be received. The object selection can be used to determine an area within the image data to identify tracking points. When the area in the image data is over a target, the tracking points can be associated with an object appearing in the live image data.

In 1310, tracking points can be identified which are related to the selected object. Once an object is selected, the tracking points on the object can be identified on a frame to frame basis. Thus, if the camera translates or changes orientation, the location of the tracking points in the new frame can be identified and the target can be rendered in the live images so that it appears to stay over the tracked object in the image. This feature is discussed in more detail below. In particular embodiments, object detection and/or recognition may be used for each or most frames, for instance to facilitate identifying the location of tracking points.

In some embodiments, tracking an object can refer to tracking one or more points from frame to frame in the 2-D image space. The one or more points can be associated with a region in the image. The one or more points or regions can be associated with an object. However, the object doesn't have to be identified in the image. For example, the boundaries of the object in 2-D image space don't have to be known. Further, the type of object doesn't have to be identified. For example, a determination doesn't have to be made as to whether the object is a car, a person or something else appearing in the pixel data. Instead, the one or more points may be tracked based on other image characteristics that appear in successive frames. For instance, edge tracking, corner tracking, or shape tracking may be used to track one or more points from frame to frame.

One advantage of tracking objects in the manner described in the 2-D image space is that a 3-D reconstruction of an object or objects appearing in an image don't have to be performed. The 3-D reconstruction step may involve operations such as "structure from motion (SFM)" and/or "simultaneous localization and mapping (SLAM)." The 3-D reconstruction can involve measuring points in multiple images, and the optimizing for the camera poses and the point locations. When this process is avoided, significant computation time is saved. For example, avoiding the SLAM/SFM computations can enable the methods to be applied when objects in the images are moving. Typically, SLAM/SFM computations assume static environments.

In 1312, a 3-D coordinate system in the physical world can be associated with the image, such as the Earth reference frame, which as described above can be related to camera reference frame associated with the 2-D pixel data. In some embodiments, the 2-D image data can be calibrated so that the associated 3-D coordinate system is anchored to the selected target such that the target is at the origin of the 3-D coordinate system.

Then, in 1314, a 2-D or 3-D trajectory or path can be defined in the 3-D coordinate system. For example, a trajectory or path, such as an arc or a parabola can be mapped to a drawing plane which is perpendicular to the gravity vector in the Earth reference frame. As described above, based upon the orientation of the camera, such as information provided from an IMU, the camera reference frame including the 2-D pixel data can be mapped to the Earth reference frame. The mapping can be used to render the curve defined in the 3-D coordinate system into the 2-D pixel data from the live image data. Then, a synthetic image including the live image data and the virtual object, which is the trajectory or path, can be output to a display.

In general, virtual objects, such as curves or surfaces can be defined in a 3-D coordinate system, such as the Earth reference frame or some other coordinate system related to an orientation of the camera. Then, the virtual objects can be rendered into the 2-D pixel data associated with the live image data to create a synthetic image. The synthetic image can be output to a display.

In some embodiments, the curves or surfaces can be associated with a 3-D model of an object, such as person or a car. In another embodiment, the curves or surfaces can be associated with text. Thus, a text message can be rendered into the live image data. In other embodiments, textures can be assigned to the surfaces in the 3-D model. When a synthetic image is created, these textures can be rendered into the 2-D pixel data associated with the live image data.

When a curve is rendered on a drawing plane in the 3-D coordinate system, such as the Earth reference frame, one or more of the determined tracking points can be projected onto the drawing plane. As another example, a centroid associated with the tracked points can be projected onto the drawing plane. Then, the curve can be defined relative to one or more points projected onto the drawing plane. For example, based upon the target location, a point can be determined on the drawing plane. Then, the point can be used as the center of a circle or arc of some radius drawn in the drawing plane.

In 1314, based upon the associated coordinate system, a curve can be rendered into to the live image data as part of the AR system. In general, one or more virtual objects including plurality of curves, lines or surfaces can be rendered into the live image data. Then, the synthetic image including the live image data and the virtual objects can be output to a display in real-time.

In some embodiments, the one or more virtual object rendered into the live image data can be used to help a user capture images used to create a MVIDMR. For example, the user can indicate a desire to create a MVIDMR of a real object identified in the live image data. The desired MVIDMR can span some angle range, such as forty-five, ninety, one hundred eighty degrees or three hundred sixty degrees. Then, a virtual object can be rendered as a guide where the guide is inserted into the live image data. The guide can indicate a path along which to move the camera and the progress along the path. The insertion of the guide can involve modifying the pixel data in the live image data in accordance with coordinate system in 1312.

In the example above, the real object can be some object which appears in the live image data. For the real object, a 3-D model may not be constructed. Instead, pixel locations or pixel areas can be associated with the real object in the 2-D pixel data. This definition of the real object is much less computational expensive than attempting to construct a 3-D model of the real object in physical space.

The virtual objects, such as lines or surfaces can be modeled in the 3-D space. The virtual objects can be defined a priori. Thus, the shape of the virtual object doesn't have to be constructed in real-time, which is computational expensive. The real objects which may appear in an image are not known a priori. Hence, 3-D models of the real object are not typically available. Therefore, the synthetic image can include "real" objects which are only defined in the 2-D image space via assigning tracking points or areas to the real object and virtual objects which are modeled in a 3-D coordinate system and then rendered into the live image data.

Returning to FIG. 13, in 1316, AR image with one or more virtual objects can be output. The pixel data in the live image data can be received at a particular frame rate. In particular embodiments, the augmented frames can be output at the same frame rate as it received. In other embodiments, it can be output at a reduced frame rate. The reduced frame rate can lessen computation requirements. For example, live data received at 30 frames per second can be output at 15 frames per second. In another embodiment, the AR images can be output at a reduced resolution, such as 240p instead of 480p. The reduced resolution can also be used to reduce computational requirements.

In 1318, one or more images can be selected from the live image data and stored for use in a MVIDMR. In some embodiments, the stored images can include one or more virtual objects. Thus, the virtual objects can be become part of the MVIDMR. In other embodiments, the virtual objects are only output as part of the AR system. But, the image data which is stored for use in the MVIDMR may not include the virtual objects.

In yet other embodiments, a portion of the virtual objects output to the display as part of the AR system can be stored. For example, the AR system can be used to render a guide during the MVIDMR image capture process and render a label associated with the MVIDMR. The label may be stored in the image data for the MVIDMR. However, the guide may not be stored. To store the images without the added virtual objects, a copy may have to be made. The copy can be modified with the virtual data and then output to a display and the original stored or the original can be stored prior to its modification.

In FIG. 14, the method in FIG. 13 is continued. In 1422, new image data can be received. In 1424, new IMU data (or, in general sensor data) can be received. The IMU data can represent a current orientation of the camera. In 1426, the location of the tracking points identified in previous image data can be identified in the new image data.

The camera may have tilted and/or moved. Hence, the tracking points may appear at a different location in the pixel data. As described above, the tracking points can be used to define a real object appearing in the live image data. Thus, identifying the location of the tracking points in the new image data allows the real object to be tracked from image to image. The differences in IMU data from frame to frame and knowledge of the rate at which the frames are recorded can be used to help to determine a change in location of tracking points in the live image data from frame to frame.

The tracking points associated with a real object appearing in the live image data may change over time. As a camera moves around the real object, some tracking points identified on the real object may go out of view as new portions of the real object come into view and other portions of the real object are occluded. Thus, in 1426, a determination may be made whether a tracking point is still visible in an image. In addition, a determination may be made as to whether a new portion of the targeted object has come into view. New tracking points can be added to the new portion to allow for continued tracking of the real object from frame to frame.

In 1428, a coordinate system can be associated with the image. For example, using an orientation of the camera determined from the sensor data, the pixel data can be calibrated to an Earth reference frame as previously described. In 1430, based upon the tracking points currently placed on the object and the coordinate system a target location can be determined. The target can be placed over the real object which is tracked in live image data. As described above, a number and a location of the tracking points identified in an image can vary with time as the position of the camera changes relative to the camera. Thus, the location of the target in the 2-D pixel data can change. A virtual object representing the target can be rendered into the live image data. In particular embodiments, a coordinate system may be defined based on identifying a position from the tracking data and an orientation from the IMU (or other) data.

In 1432, a track location in the live image data can be determined. The track can be used to provide feedback associated with a position and orientation of a camera in physical space during the image capture process for a MVIDMR. As an example, as described above, the track can be rendered in a drawing plane which is perpendicular to the gravity vector, such as parallel to the ground. Further, the track can be rendered relative to a position of the target, which is a virtual object, placed over a real object appearing in the live image data. Thus, the track can appear to surround or partially surround the object. As described above, the position of the target can be determined from the current set of tracking points associated with the real object appearing in the image. The position of the target can be projected onto the selected drawing plane.

In 1434, a capture indicator status can be determined. The capture indicator can be used to provide feedback in regards to what portion of the image data used in a MVIDMR has been captured. For example, the status indicator may indicate that half of angle range of images for use in a MVIDMR has been captured. In another embodiment, the status indicator may be used to provide feedback in regards to whether the camera is following a desired path and maintaining a desired orientation in physical space. Thus, the status indicator may indicate the current path or orientation of the camera is desirable or not desirable. When the current path or orientation of the camera is not desirable, the status indicator may be configured to indicate what type of correction which is needed, such as but not limited to moving the camera more slowly, starting the capture process over, tilting the camera in a certain direction and/or translating the camera in a particular direction.

In 1436, a capture indicator location can be determined. The location can be used to render the capture indicator into the live image and generate the synthetic image. In some embodiments, the position of the capture indicator can be determined relative to a position of the real object in the image as indicated by the current set of tracking points, such as above and to left of the real object. In 1438, a synthetic image, i.e., a live image augmented with virtual objects, can be generated. The synthetic image can include the target, the track and one or more status indicators at their determined locations, respectively. In 1440, image data captured for the purposes of use in a MVIDMR can be captured. As described above, the stored image data can be raw image data without virtual objects or may include virtual objects.

In 1442, a check can be made as to whether images needed to generate a MVIDMR have been captured in accordance with the selected parameters, such as a MVIDMR spanning a desired angle range. When the capture is not complete, new image data may be received and the method may return to 1422. When the capture is complete, a virtual object can be rendered into the live image data indicating the completion of the capture process for the MVIDMR and a MVIDMR can be created. Some virtual objects associated with the capture process may cease to be rendered. For example, once the needed images have been captured the track used to help guide the camera during the capture process may no longer be generated in the live image data.

Figure 15A:
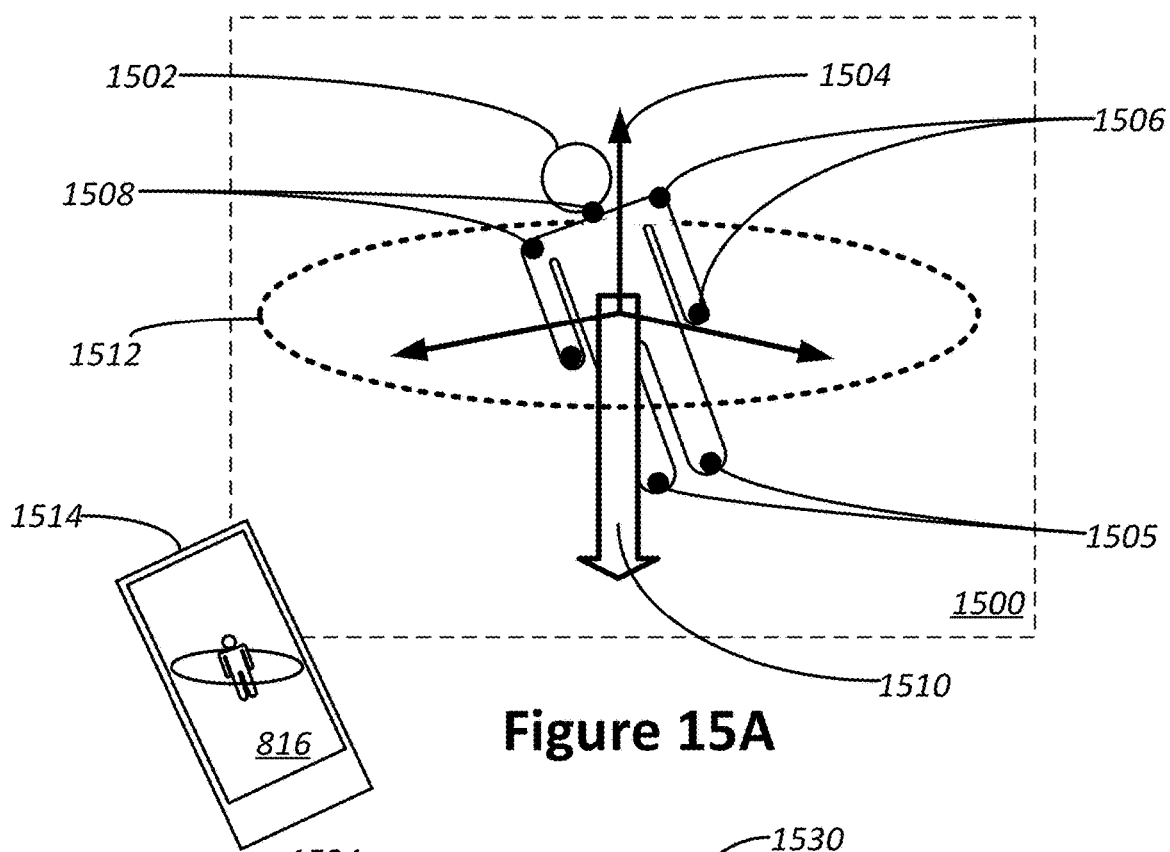
FIGS. 15A and 15B illustrate some aspects of generating an Augmented Reality (AR) image capture track for capturing images used in a MVIDMR.
Figure 15B:
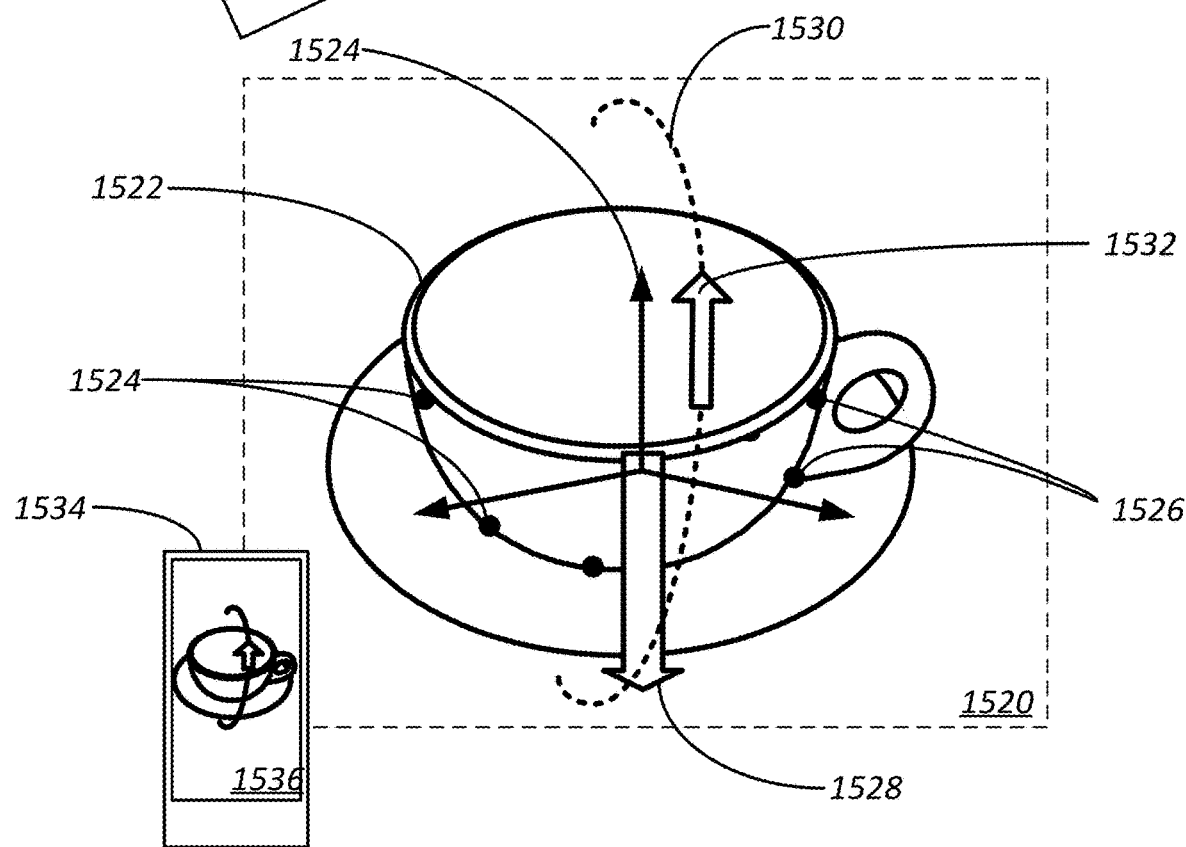

FIGS. 15A and 15B illustrate aspects of generating an Augmented Reality (AR) image capture track for capturing images used in a MVIDMR. In FIG. 15A, a mobile device 1514 with a display 1516 is shown. The mobile device can include at least one camera (not shown) with a field of view 1500. A real object 1502, which is a person, is selected in the field of view 1500 of the camera. A virtual object, which is a target (not shown), may have been used to help select the real object. For example, the target on a touch screen display of the mobile device 1514 may have been placed over the object 1502 and then selected.

The camera can include an image sensor which captures light in the field of view 1500. The data from the image sensor can be converted to pixel data. The pixel data can be modified prior to its output on display 1516 to generate a synthetic image. The modifications can include rendering virtual objects in the pixel data as part of an augmented reality (AR) system.

Using the pixel data and a selection of the object 1502, tracking points on the object can be determined. The tracking points can define the object in image space. Locations of a current set of tracking points, such as 1505, 1506 and 1508, which can be attached to the object 1502 are shown. As a position and orientation of the camera on the mobile device 1514, the shape and position of the object 1502 in the captured pixel data can change. Thus, the location of the tracking points in the pixel data can change. Thus, a previously defined tracking point can move from a first location in the image data to a second location. Also, a tracking point can disappear from the image as portions of the object are occluded.

Using sensor data from the mobile device 1514, an Earth reference frame 3-D coordinate system 1504 can be associated with the image data. The direction of the gravity vector is indicated by arrow 1510. As described above, in a particular embodiment, the 2-D image data can be calibrated relative to the Earth reference frame. The arrow representing the gravity vector is not rendered into the live image data. However, if desired, an indicator representative of the gravity could be rendered into the synthetic image.

A plane which is perpendicular to the gravity vector can be determined. The location of the plane can be determined using the tracking points in the image, such as 1505, 1506 and 1508. Using this information, a curve, which is a circle, is drawn in the plane. The circle can be rendered into to the 2-D image data and output as part of the AR system. As is shown on display 1516, the circle appears to surround the object 1502. In some embodiments, the circle can be used as a guide for capturing images used in a MVIDMR.

If the camera on the mobile device 1514 is rotated in some way, such as tilted, the shape of the object will change on display 1516. However, the new orientation of the camera can be determined in space including a direction of the gravity vector. Hence, a plane perpendicular to the gravity vector can be determined. The position of the plane and hence, a position of the curve in the image can be based upon a centroid of the object determined from the tracking points associated with the object 1502. Thus, the curve can appear to remain parallel to the ground, i.e., perpendicular to the gravity vector, as the camera 1514 moves. However, the position of the curve can move from location to location in the image as the position of the object and its apparent shape in the live images changes.

In FIG. 15B, a mobile device 1534 including a camera (not shown) and a display 1536 for outputting the image data from the camera is shown. A cup 1522 is shown in the field of view of camera 1520 of the camera. Tracking points, such as 1524 and 1526, have been associated with the object 1522. These tracking points can define the object 1522 in image space. Using the IMU data from the mobile device 1534, a reference frame has been associated with the image data. As described above, In some embodiments, the pixel data can be calibrated to the reference frame. The reference frame is indicated by the 3-D axes 1524 and the direction of the gravity vector is indicated by arrow 1528.

As described above, a plane relative to the reference frame can be determined. In this example, the plane is parallel to the direction of the axis associated with the gravity vector as opposed to perpendicular to the frame. This plane is used to proscribe a path for the MVIDMR which goes over the top of the object 1530. In general, any plane can be determined in the reference frame and then a curve, which is used as a guide, can be rendered into the selected plane.

Using the locations of the tracking points, In some embodiments, a centroid of the object 1522 on the selected plane in the reference can be determined. A curve 1530, such as a circle, can be rendered relative to the centroid. In this example, a circle is rendered around the object 1522 in the selected plane.

The curve 1530 can serve as a track for guiding the camera along a particular path where the images captured along the path can be converted into a MVIDMR. In some embodiments, a position of the camera along the path can be determined. Then, an indicator can be generated which indicates a current location of the camera along the path. In this example, current location is indicated by arrow 1532.

The position of the camera along the path may not directly map to physical space, i.e., the actual position of the camera in physical space doesn't have to be necessarily determined. For example, an angular change can be estimated from the IMU data and optionally the frame rate of the camera. The angular change can be mapped to a distance moved along the curve where the ratio of the distance moved along the path 1530 is not a one to one ratio with the distance moved in physical space. In another example, a total time to traverse the path 1530 can be estimated and then the length of time during which images have been recorded can be tracked. The ratio of the recording time to the total time can be used to indicate progress along the path 1530.

The path 1530, which is an arc, and arrow 1532 are rendered into the live image data as virtual objects in accordance with their positions in the 3-D coordinate system associated with the live 2-D image data. The cup 1522, the circle 1530 and the 1532 arrow are shown output to display 1536. The orientation of the curve 1530 and the arrow 1532 shown on display 1536 relative to the cup 1522 can change if the orientation of the camera is changed, such as if the camera is tilted.

In particular embodiments, a size of the object 1522 in the image data can be changed. For example, the size of the object can be made bigger or smaller by using a digital zoom. In another example, the size of the object can be made bigger or smaller by moving the camera, such as on mobile device 1534, closer or farther away from the object 1522.

When the size of the object changes, the distances between the tracking points can change, i.e., the pixel distances between the tracking points can increase or can decrease. The distance changes can be used to provide a scaling factor. In some embodiments, as the size of the object changes, the AR system can be configured to scale a size of the curve 1530 and/or arrow 1532. Thus, a size of the curve relative to the object can be maintained.

In another embodiment, a size of the curve can remain fixed. For example, a diameter of the curve can be related to a pixel height or width of the image, such as 150 percent of the pixel height or width. Thus, the object 1522 can appear to grow or shrink as a zoom is used or a position of the camera is changed. However, the size of curve 1530 in the image can remain relatively fixed.

Figure 16:
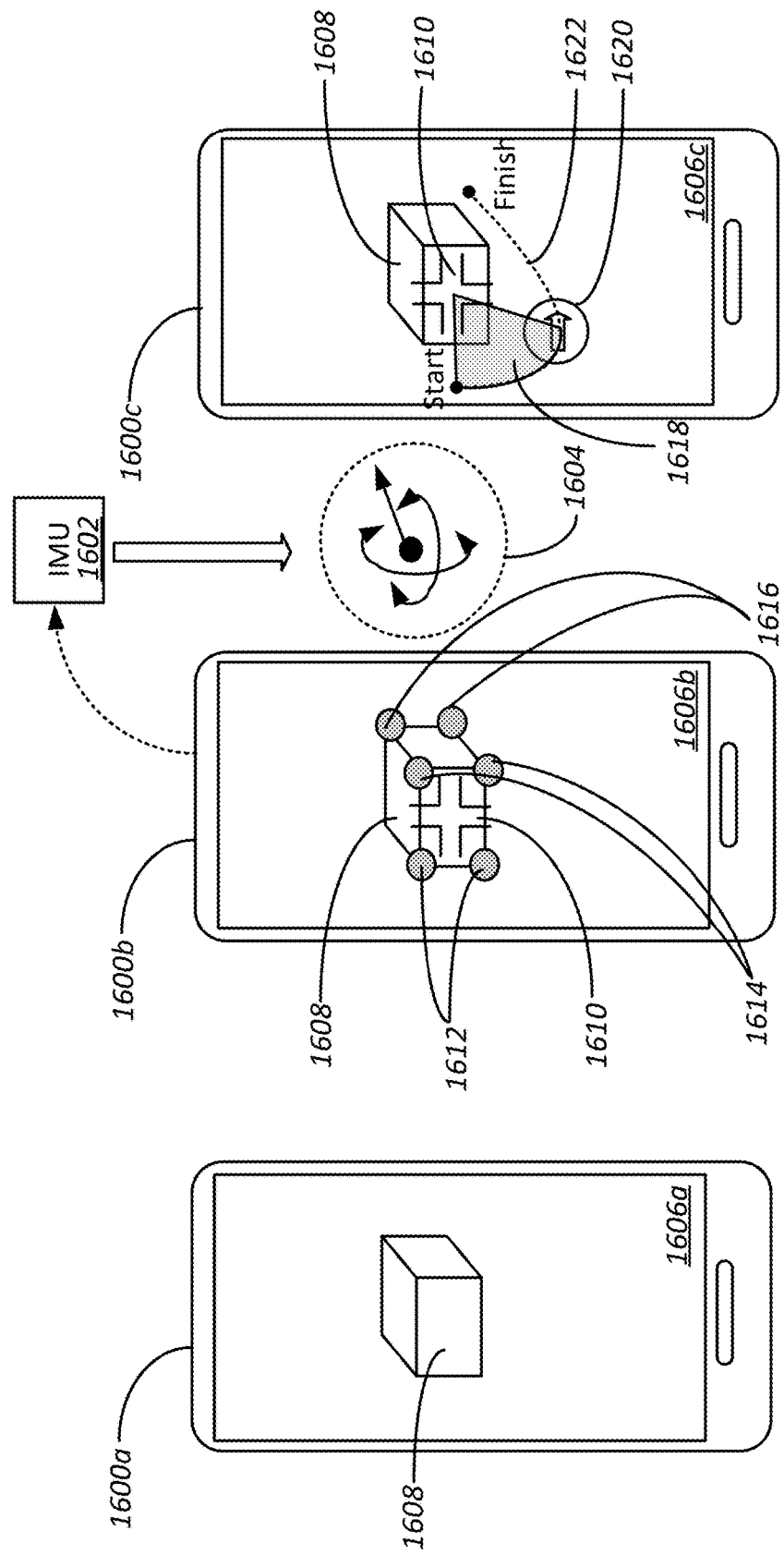
FIG. 16 illustrates one example of generating an Augmented Reality (AR) image capture track for capturing images used in a MVIDMR on a mobile device.

FIG. 16 illustrates a second example of generating an Augmented Reality (AR) image capture track for capturing images used in a MVIDMR on a mobile device. FIG. 16 includes a mobile device at three times 1600a, 1600b and 1600c. The device can include at least one camera, a display, an IMU, a processor (CPU), memory, microphone, audio output devices, communication interfaces, a power supply, graphic processor (GPU), graphical memory and combinations thereof. The display is shown with images at three times 1606a, 1606b and 1606c. The display can be overlaid with a touch screen.

In 1606a, an image of an object 1608 is output to the display in state 1606a. The object is a rectangular box. The image data output to the display can be live image data from a camera on the mobile device. The camera could also be a remote camera.

In some embodiments, a target, such as 1610, can be rendered to the display. The target can be combined with the live image data to create a synthetic image. Via the input interface on the phone, a user may be able to adjust a position of the target on the display. The target can be placed on an object and then an additional input can be made to select the object. For example, the touch screen can be tapped at the location of the target.

In another embodiment, object recognition can be applied to the live image data. Various markers can be rendered to the display, which indicate the position of the identified objects in the live image data. To select an object, the touchscreen can be tapped at a location of one of markers appearing in the image or another input device can be used to select the recognized object.

After an object is selected, a number of initial tracking points can be identified on the object, such as 1612, 1614 and 1616. In some embodiments, the tracking points may not appear on the display. In another embodiment, the tracking points may be rendered to the display. In some embodiments, if the tracking point is not located on the object of interest, the user may be able to select the tracking point and delete it or move it so that the tracking point lies on the object.

Next, an orientation of the mobile device can change. The orientation can include a rotation through one or more angles and translational motion as shown in 1604. The orientation change and current orientation of the device can be captured via the IMU data from IMU 1602 on the device.

As the orientation of the device is changed, one or more of the tracking points, such as 1612, 1614 and 1616, can be occluded. In addition, the shape of surfaces currently appearing in the image can change. Based on changes between frames, movement at various pixel locations can be determined. Using the IMU data and the determined movement at the various pixel locations, surfaces associated with the object 1608 can be predicted. The new surfaces can be appearing in the image as the position of the camera changes. New tracking points can be added to these surfaces.

As described above, the mobile device can be used to capture images used in a MVIDMR. To aid in the capture, the live image data can be augmented with a track or other guides to help the user move the mobile device correctly. The track can include indicators that provide feedback to a user while images associated with a MVIDMR are being recorded. In 1606c, the live image data is augmented with a path 1622. The beginning and end of the path is indicated by the text, "start" and "finish." The distance along the path is indicated by shaded region 1618.

The circle with the arrow 1620 is used to indicate a location on the path. In some embodiments, the position of the arrow relative to the path can change. For example, the arrow can move above or below the path or point in a direction which is not aligned with the path. The arrow can be rendered in this way when it is determined the orientation of the camera relative to the object or position of the camera diverges from a path that is desirable for generating the MVIDMR. Colors or other indicators can be used to indicate the status. For example, the arrow and/or circle can be rendered green when the mobile device is properly following the path and red when the position/orientation of the camera relative to the object is less than optimal.

Figure 17A:
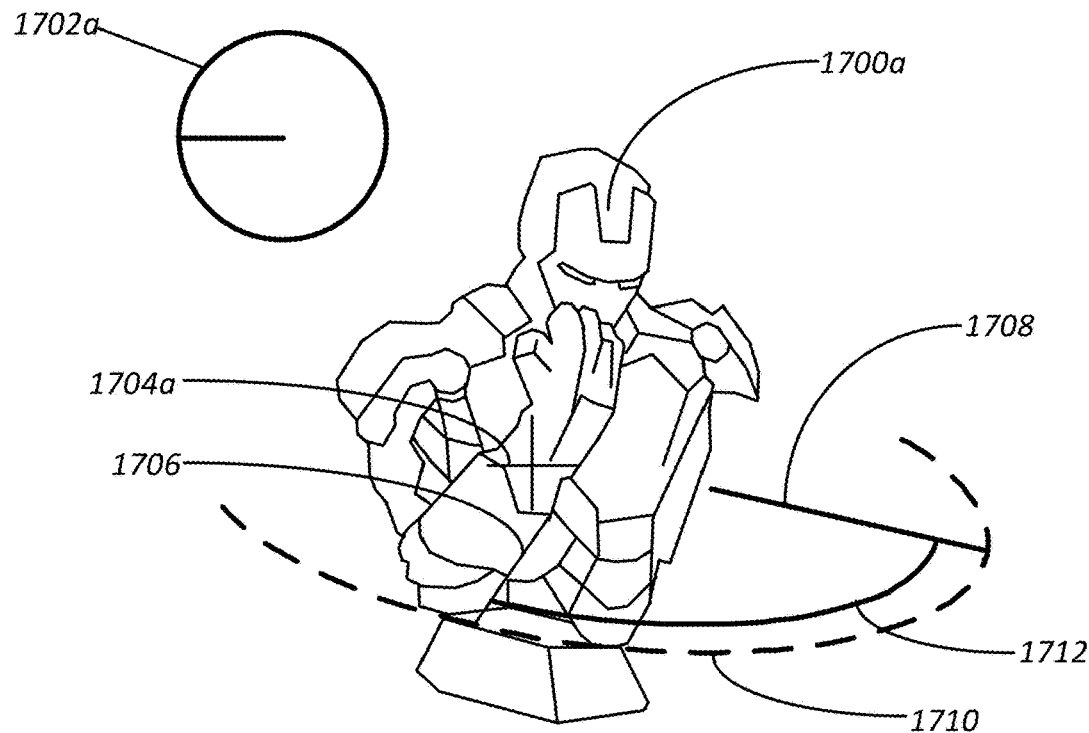
FIGS. 17A and 17B illustrate examples of generating an Augmented Reality (AR) image capture track including status indicators for capturing images used in a MVIDMR.
Figure 17B:
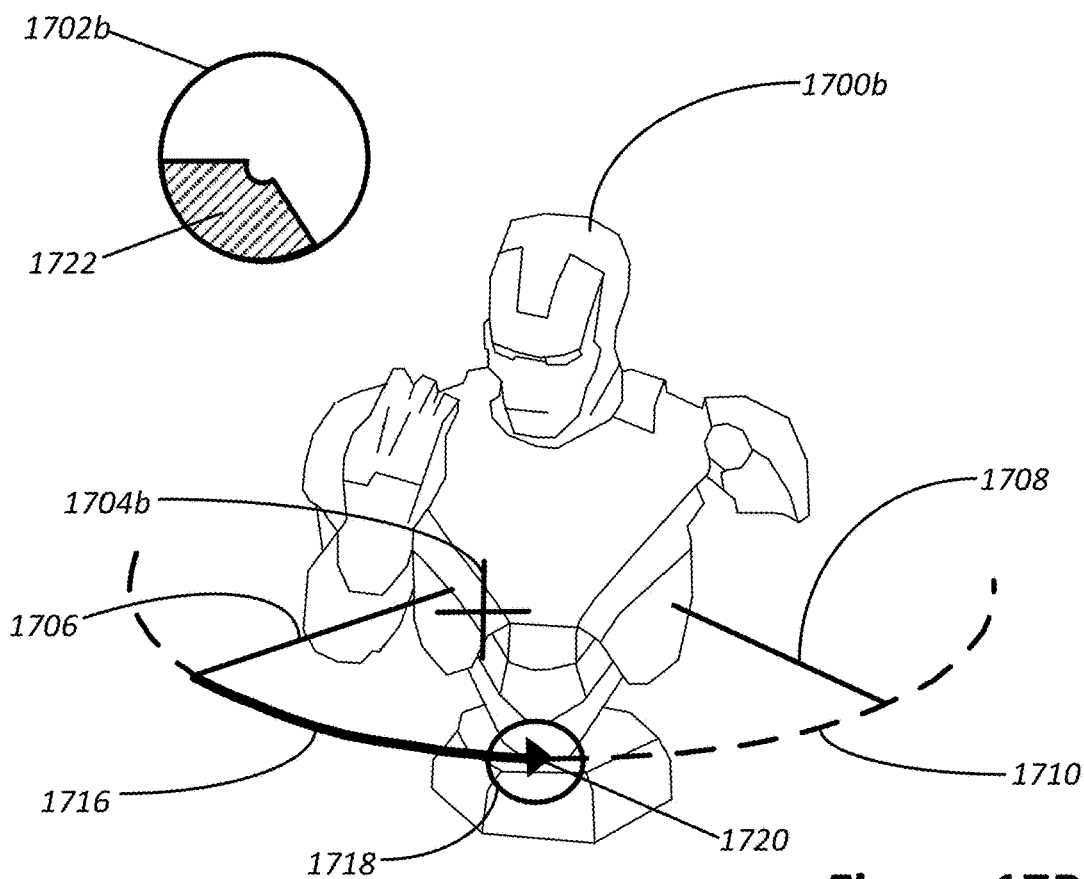

FIGS. 17A and 17B illustrate yet another example of generating an Augmented Reality (AR) image capture track including status indicators for capturing images used in a MVIDMR. The synthetic image generated by the AR system can consist of live image data from a camera augmented with one or more virtual objects. For example, as described above, the live image data can be from a camera on a mobile device.

In FIG. 17A, an object 1700a, which is a statue, is shown in an image 1715 from a camera at a first position and orientation. The object 1700a can be selected via the cross hairs 1704a. Once the cross hairs are placed on the object and the object is selected, the cross hairs can move and remain on the object as the object 1700a moves in the image data. As described above, as an object's position/orientation changes in an image, a location to place the cross hairs in an image can be determined. In some embodiments, the position of the cross hairs can be determined via tracking the movements of points in the image, i.e., the tracking points.

In particular embodiments, if another object is moved in front of a tracked object, it may not be possible to associate the target 1704a with the object. For example, if a person moves in front of the camera, a hand is passed in front of the camera or the camera is moved so the object no longer appears in the camera field of view, then the object which is being tracked will no longer be visible. Hence, it may not be possible to determine a location for the target associated with the tracked object. In the instance where the object reappears in the image, such as if a person that blocked the view of the object moved into and out of the view, then the system can be configured to reacquire the tracking points and reposition the target.

A first virtual object is rendered as indicator 1702a. Indicator 1702a can be used to indicate the progress in capturing images for a MVIDMR. A second virtual object is rendered as curve 1710. Third and fourth virtual objects are rendered as lines 1706 and 1708. A fifth virtual object is rendered as curve 1712.

The curve 1710 can be used to depict a path of a camera. Whereas lines 1706 and 1708 and curve 1712 can be used to indicate an angle range for the MVIDMR. In this example, the angle range is about ninety degrees.

In FIG. 17B, the position of the camera is different as compared to FIG. 17A. Hence, a different view of object 1700b is presented in image 1725. In particular, the camera view shows more of the front of the object as compared to the view in FIG. 17A. The target 1704b is still affixed to the object 1700b. However, the target is fixed in a different location on the object, i.e., on a front surface as opposed to an arm.

The curve 1716 with arrow 1720 at the end is used to indicate the progress of the image capture along curve 1710. The circle 1718 around the arrow 1720 further highlights the current position of the arrow. As described above, a position and a direction of the arrow 1720 can be used to provide feedback to a user on a deviation of the camera position and/or orientation from curve 1710. Based upon this information, the user may adjust a position and/or orientation of the camera while it is capturing the image data.

Lines 1706 and 1708 still appear in the image but are positioned differently relative to object 1700b. The lines again indicate an angle range. In 1720, the arrow is about half way between lines 1706 and 1708. Hence, an angle of about 45 degrees has been captured around the object 1700b.

The indicator 1702b now includes a shaded region 1722. The shaded region can indicate a portion of a MVIDMR angle range currently captured. In some embodiments, lines 1706 and 1708 can only indicate a portion of the angle range in a MVIDMR that is being captured and the total angle range can be shown via indicator 1702b. In this example, the angle range shown by indicator 1702b is three hundred sixty degrees while lines 1706 and 1708 show a portion of this range which ninety degrees.

Figure 18:
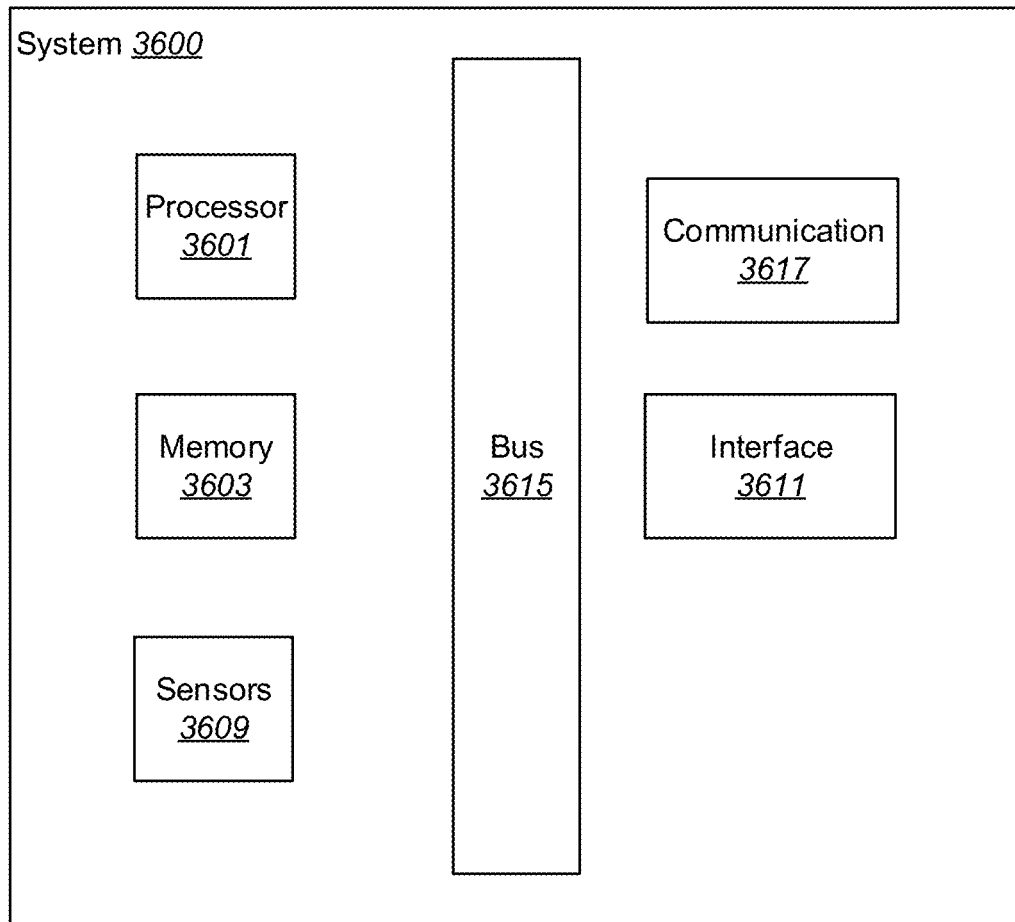
FIG. 18 illustrates a particular example of a computer system configured in accordance with various embodiments.

With reference to FIG. 18, shown is a particular example of a computer system that can be used to implement particular examples. For instance, the computer system 1800 can be used to provide MVIDMRs according to various embodiments described above. According to various embodiments, a system 1800 suitable for implementing particular embodiments includes a processor 1801, a memory 1803, an interface 1811, and a bus 1815 (e.g., a PCI bus).

The system 1800 can include one or more sensors, such as light sensors, accelerometers, gyroscopes, microphones, cameras including stereoscopic or structured light cameras. As described above, the accelerometers and gyroscopes may be incorporated in an IMU. The sensors can be used to detect movement of a device and determine a position of the device. Further, the sensors can be used to provide inputs into the system. For example, a microphone can be used to detect a sound or input a voice command.

In the instance of the sensors including one or more cameras, the camera system can be configured to output native video data as a live video feed. The live video feed can be augmented and then output to a display, such as a display on a mobile device. The native video can include a series of frames as a function of time. The frame rate is often described as frames per second (fps). Each video frame can be an array of pixels with color or gray scale values for each pixel. For example, a pixel array size can be 512 by 512 pixels with three color values (red, green and blue) per pixel.

The three-color values can be represented by varying amounts of bits, such as 24, 30, 36, 40 bits, etc. per pixel. When more bits are assigned to representing the RGB color values for each pixel, a larger number of colors values are possible. However, the data associated with each image also increases. The number of possible colors can be referred to as the color depth.

The video frames in the live video feed can be communicated to an image processing system that includes hardware and software components. The image processing system can include non-persistent memory, such as random-access memory (RAM) and video RAM (VRAM). In addition, processors, such as central processing units (CPUs) and graphical processing units (GPUs) for operating on video data and communication busses and interfaces for transporting video data can be provided. Further, hardware and/or software for performing transformations on the video data in a live video feed can be provided.

In particular embodiments, the video transformation components can include specialized hardware elements configured to perform functions necessary to generate a synthetic image derived from the native video data and then augmented with virtual data. In data encryption, specialized hardware elements can be used to perform a specific data transformation, i.e., data encryption associated with a specific algorithm. In a similar manner, specialized hardware elements can be provided to perform all or a portion of a specific video data transformation. These video transformation components can be separate from the GPU(s), which are specialized hardware elements configured to perform graphical operations. All or a portion of the specific transformation on a video frame can also be performed using software executed by the CPU.

The processing system can be configured to receive a video frame with first RGB values at each pixel location and apply operation to determine second RGB values at each pixel location. The second RGB values can be associated with a transformed video frame which includes synthetic data. After the synthetic image is generated, the native video frame and/or the synthetic image can be sent to a persistent memory, such as a flash memory or a hard drive, for storage. In addition, the synthetic image and/or native video data can be sent to a frame buffer for output on a display or displays associated with an output interface. For example, the display can be the display on a mobile device or a view finder on a camera.

In general, the video transformations used to generate synthetic images can be applied to the native video data at its native resolution or at a different resolution. For example, the native video data can be a 512 by 512 array with RGB values represented by 24 bits and at frame rate of 24 fps. In some embodiments, the video transformation can involve operating on the video data in its native resolution and outputting the transformed video data at the native frame rate at its native resolution.

In other embodiments, to speed up the process, the video transformations may involve operating on video data and outputting transformed video data at resolutions, color depths and/or frame rates different than the native resolutions. For example, the native video data can be at a first video frame rate, such as 24 fps. But, the video transformations can be performed on every other frame and synthetic images can be output at a frame rate of 12 fps. Alternatively, the transformed video data can be interpolated from the 12 fps rate to 24 fps rate by interpolating between two of the transformed video frames.

In another example, prior to performing the video transformations, the resolution of the native video data can be reduced. For example, when the native resolution is 512 by 512 pixels, it can be interpolated to a 256 by 256 pixel array using a method such as pixel averaging and then the transformation can be applied to the 256 by 256 array. The transformed video data can output and/or stored at the lower 256 by 256 resolution. Alternatively, the transformed video data, such as with a 256 by 256 resolution, can be interpolated to a higher resolution, such as its native resolution of 512 by 512, prior to output to the display and/or storage. The coarsening of the native video data prior to applying the video transformation can be used alone or in conjunction with a coarser frame rate.

As mentioned above, the native video data can also have a color depth. The color depth can also be coarsened prior to applying the transformations to the video data. For example, the color depth might be reduced from 40 bits to 24 bits prior to applying the transformation.

As described above, native video data from a live video can be augmented with virtual data to create synthetic images and then output in real-time. In particular embodiments, real-time can be associated with a certain amount of latency, i.e., the time between when the native video data is captured and the time when the synthetic images including portions of the native video data and virtual data are output. In particular, the latency can be less than 100 milliseconds. In other embodiments, the latency can be less than 50 milliseconds. In other embodiments, the latency can be less than 30 milliseconds. In yet other embodiments, the latency can be less than 20 milliseconds. In yet other embodiments, the latency can be less than 10 milliseconds.

The interface 1811 may include separate input and output interfaces, or may be a unified interface supporting both operations. Examples of input and output interfaces can include displays, audio devices, cameras, touch screens, buttons and microphones. When acting under the control of appropriate software or firmware, the processor 1801 is responsible for such tasks such as optimization. Various specially configured devices can also be used in place of a processor 1801 or in addition to processor 1801, such as graphical processor units (GPUs). The complete implementation can also be done in custom hardware. The interface 1811 is typically configured to send and receive data packets or data segments over a network via one or more communication interfaces, such as wireless or wired communication interfaces. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 1800 uses memory 1803 to store data and program instructions and maintained a local side cache. The program instructions may control the operation of an operating system and/or one or more applications, for example. The memory or memories may also be configured to store received metadata and batch requested metadata.

The system 1800 can be integrated into a single device with a common housing. For example, system 1800 can include a camera system, processing system, frame buffer, persistent memory, output interface, input interface and communication interface. In various embodiments, the single device can be a mobile device like a smart phone, an augmented reality and wearable device like Google Glass™ or a virtual reality head set that includes a multiple cameras, like a Microsoft Hololens™. In other embodiments, the system 1800 can be partially integrated. For example, the camera system can be a remote camera system. As another example, the display can be separate from the rest of the components like on a desktop PC.

In the case of a wearable system, like a head-mounted display, as described above, a virtual guide can be provided to help a user record a MVIDMR. In addition, a virtual guide can be provided to help teach a user how to view a MVIDMR in the wearable system. For example, the virtual guide can be provided in synthetic images output to head mounted display which indicate that the MVIDMR can be viewed from different angles in response to the user moving some manner in physical space, such as walking around the projected image. As another example, the virtual guide can be used to indicate a head motion of the user can allow for different viewing functions. In yet another example, a virtual guide might indicate a path that a hand could travel in front of the display to instantiate different viewing functions.

FIG. 19 illustrates a method 1900 of determining an orientation of an object, performed in accordance with one or more embodiments. The method 1900 may be performed on any suitable computing device. For example, the method 1900 may be performed on a mobile computing device such as a smartphone. Alternately or additionally, the method 1900 may be performed on a remote server in communication with a mobile computing device.

A request to determine an orientation of an object is received at 1902. According to various embodiments, the request may be received at a user interface. For example, the request may be received via an application at a mobile computing device. As another example, the request may be received at a user interface at a laptop.

At 1904, an image of the object is selected for analysis. According to various embodiments, the image may be a single two-dimensional image of the object. Alternately or additionally, the image may be one of a series of two-dimensional images of the object captured from different viewpoints. In some implementations, the image may be a single frame of a video stream of the object. In some embodiments, the image may be a 360-degree multi-view capture of the object. Alternately, the image may include a view that has less than 360-degree coverage.

Optionally, a bounding box for the object is determined at 1906. According to various embodiments, a bounding box for the object may include coordinates of a rectangular or non-rectangular border that encloses the object in the selected image. The bounding box may be determined by a neural network. For example, a neural network may be trained to determine the coordinates of the visible object pixels in an image of the object. The neural network may facilitate the determination of the pixel coordinates and the width, height, or other characteristics of the bounding box enclosing the object. Alternately or additionally, the bounding box may be determined by a different type of algorithm. In some configurations, the bounding box may be determined at least in part based on user input. For example, the bounding box may be determined by a user super-imposing a border on the image to enclose the object. In another example, the bounding box may be determined by the user tapping on the object with an algorithm automatically estimating the extent of the bounding based on the selection. In yet another example, the user may select points or regions in the foreground and background, and an algorithm automatically separates both to estimate the extent of a corresponding bounding box.

At 1908, an estimated object orientation is determined. According to various embodiments, the estimated object orientation may be determined by a neural network. For example, a neural network may be trained to determine the estimated object orientation through an analysis of the object from one or more images of an object. The estimated object orientation may include estimates about an object's roll, elevation, angular position, attitude, and azimuth angle.

An estimated camera orientation is identified at 1910. According to various embodiments, camera orientation may be estimated from data collected from an inertial measurement unit (IMU). In some implementations, the IMU may be associated with a mobile computing device, such as a smartphone. For example, a mobile computing device may include sensors such as a camera capable of capturing visual data such as an image or video stream. A mobile computing device may also include an accelerometer, a gyroscope, and other such sensors capable of capturing IMU data. IMU data may include information such as camera location, camera angle, device velocity, device acceleration, or any of a wide variety of data collected from accelerometers or other such sensors.

In some implementations, IMU orientation may identify orientation information associated with the camera. The IMU orientation may then be used to infer orientation information about the object. For example, the IMU orientation may indicate that the image was captured with a camera located at a particular height and angle relative to the object and/or ground. Alternatively, or additionally, the orientation estimation might be done using a pose estimation algorithm based on image data. In some configurations, the pose estimation method might also consider the available IMU data.

At 1912, an offset is determined between the estimated object orientation and the estimated camera orientation. According to various embodiments, the determination may be made at least in part by identifying a difference between the two values. Alternately, or additionally, the determination may be made at least in part by refining the object orientation based on additional information characterizing the position and angle of the camera.

A determination is made at 1914 as to whether to select an additional image of the object for analysis. In some implementations, additional images may be selected until all available images have been analyzed. For example, each image associated with a multi-view capture may be analyzed. If multiple images have been processed, then a combined offset may be to be calculated. For example, the offset can be averaged from the results obtained from multiple images. In another example, a robust method for estimating the final offset from multiple computed offsets might be used, for instance to handle outliers such as an inaccurate orientation estimation for certain images.

In some embodiments, the determination made at 1914 may be made at least in part automatically. For example, the estimated object orientation procedure at 1908 may attempt to estimate an orientation for the object, but may fail due to incomplete image information or other information. A determination may be automatically made to prompt the user to capture or upload additional images of the object.

In some implementations, the determination made at 1914 may be made at least in part as a request by a user. For example, a user may be prompted to select an additional image for analysis. Alternately or additionally, a user may be prompted to review an estimated object orientation, and a user may review the estimated object orientation and may elect to analyze additional images of the object in order to improve the accuracy or quality of the estimated object orientation. In some implementations, every N-th frame of the multi-view capture might be processed.

At 1916, the orientation estimation information is stored. According to various embodiments, storing the orientation estimation information may involve storing one or more orientation values for each of the images analyzed in FIG. 19. For example, orientation information may be stored to supplement a multi-view capture.

In some implementations, the orientation estimation may be stored on a storage device. Alternately, or additionally, the orientation estimation may be transmitted to a remote location via a network.

According to various embodiments, one or more operations shown in FIG. 19 may be omitted. For example, any or all of operations 1910 and 1912 may be omitted.

FIG. 20 illustrates a method for determining an object orientation based on 3D data. The method 2000 may be performed on any suitable computing device. For example, the method 2000 may be performed on a mobile computing device such as a smartphone. Alternately or additionally, the method 2000 may be performed on a remote server in communication with a mobile computing device.

A request to determine an orientation of an object is received at 2002. In some implementations, the request may be received at a user interface. At 2004, image information for the object is captured. In some implementations, the image information may include a video or image set of the object is captured from multiple perspectives. The image information may include a 360-degree view of the object. Alternately, the image information may include a view that has less than 360-degree coverage.

An object is identified for analysis at 2006. In some embodiments, the object may be identified via an algorithm. For example, the object may be identified via an image recognition algorithm. As another example, the object may be identified via a bounding box algorithm.

In some implementations, the object may be identified based at least in part on user input. For instance, a user may identify the object as a vehicle via a user interface component such as a drop-down menu.

At 2008, one or more points of reference are identified on the object. According to various embodiments, points of reference may include one or more fiducial points on the object. Fiducial points are identifiable locations on objects of a particular type that in general should be present on all or nearly all objects of that type and that provide an indication as to the object's orientation. For example, in the case of a vehicle, fiducial points may include but are not limited to the vehicle's headlights, rearview mirror, and wheels.

In some implementations, the reference points may be identified via an algorithm, such as an image recognition algorithm. Alternately or additionally, reference points may be identified in part through user input.

A sparse 3D mesh of an object is determined at 2010. According to various embodiments, the sparse 3D mesh may be determined by using the fiducial points identified in operation 2008 as vertices of the mesh. For example, each face of the mesh may approximate the object shape with a planar surface.

At 2012, a 3D representation of the object is determined. According to various embodiments, the 3D representation may be constructed by elevating the fiducial points to 3D space and constructing a sparse 3D mesh from their locations. Alternately, or additionally, the object's orientation may be inferred based on cues such as surface normal of the faces of the mesh, visibility states of the fidicual points in a plurality of image, or other such features.

In some embodiments, the elevation into 3D space might be done using triangulation. Alternately, or additionally, a depth map might be computed for each frame which is then used to elevate the 20D points into 3D.

According to various embodiments, the 3D representation may be a 3D skeleton. For example, 20D skeleton detection may be performed on every frame using a machine learning procedure. As another example, 3D camera pose estimation may be performed to determine a location and angle of the camera with respect to the object for a particular frame. As yet another example, a 3D skeleton may be reconstructed from one or more 2D skeletons and/or one or more 3D models.

According to various embodiments, the 3D reconstruction of the object surface may include one or more of a variety of reconstruction procedures. For example, dominant axes may be computed to estimate orientation. As another example, an object model such as a vehicle model that has a reference orientation may be fit into a 3D reconstructed model based on the input data. As another example, one or more parts of a 3D reconstructed model may be classified to estimate an orientation of the object.

Estimated orientation for the object is determined at 2014. According to various embodiments, the estimated object orientation may be determined by a neural network. For example, a neural network may be trained to determine the estimated object orientation through an analysis of the object from one or more images of an object. The estimated object orientation may include estimates about an object's dominant axes, roll, elevation, angular position, attitude, and azimuth angle.

According to various embodiments, the object orientation may be estimated based on the sparse 3D mesh determined at operation 2010 and/or the 3D skeleton determined at operation 2012. For example, the fiducial points identified in operation 2008 facilitate the triangulation of fiducial points of the object in 3D space to help determine the azimuth, roll, elevation, and axes of the designated object. The 3D skeleton may facilitate the inference of the object's orientation based on cues such as, but not limited to, the surface normals of the faces of the mesh, and the visibility states of the fiducial points in the images of the object, and information about the three axes of the 3D skeleton model determined at operation 2012.

In some embodiments, the estimated object orientation may be determined based on a 3D reconstruction of the object. For example, the object orientation may be estimated based on the dominant axes of the 3D reconstruction of an object. As another example, the orientation for a designated object may be estimated by incorporating the orientation of a known reference object with reference orientation with a 3D reconstructed model of the designated object. As yet another example, parts of the 3D reconstructed model may be identified to determine orientation of the object. For example, in the case of a vehicle, the license plate may be identified as a reference point relative to the rearview mirror to estimate the orientation of the vehicle.

At 2016, the orientation estimation information is stored. In some implementations, the orientation estimation may be stored on a storage device. Alternately, or additionally, the orientation estimation may be transmitted to a remote location via a network.

According to various embodiments, the object orientation may be estimated based on the determination of specific reference points on the object. For example, in the case of a vehicle, a specific reference point such as the license plate may be detected in one or more images of a multi-view image set. Based on the location of the license plate in the image relative to other reference points, such as the vehicle's headlights, the orientation of the object may be inferred.

In some implementations, this determination may be performed on a 3D model of the object. For example, for a 3D model of a vehicle, the location of the license plate may be used to estimate global angle for the vehicle. Alternately, or additionally, the trajectory of a feature such as a license plate may be fit to an ellipse in image space, which corresponds to a sphere around the vehicle in 3D space, and the location on the ellipse is used to estimate the vehicle's orientation.

In some embodiments, the estimated object orientation may be determined from a single image. In some implementations, the object may not be visible from all angles or perspectives from a single image, or an image may not supply a minimum number of reference points visible to determine a sparse 3D mesh capable of facilitating the determination of a 3D skeleton of the object. In such situations, a neural network may be trained to predict coordinates of the visible object pixels in a top-down view of the object.

In particular embodiments, once the locations are mapped, the points may be lifted to 3D based on a predefined correspondence between the top-down view and a 3D mesh. Then, the transformation between the image points and the 3D mesh may be used to obtain the 3D orientation of the vehicle.

According to various embodiments, the estimated object orientation may be determined from a single image via top-down view mapping. For example, a network may be trained that takes an image of an object such as a vehicle as input and maps every point of the image onto a top-down view. Based on the distribution of the points on the top-down view, the system may then draw an inference about the orientation of the object with respect to the camera.

According to various embodiments, orientation may be estimated from a single image using a component classifier. For example, a network may be trained to identify object components such as car parts. For instance, each pixel of the image may be classified as belonging to an object component or as part of the background. The visible object components may then be used to estimate an orientation of the object.

According to various embodiments, the object orientation may be directly estimated from the detected 2D skeleton by considering which joints of the 2D skeleton are detected (i.e. are visible).

In some implementations, the estimated object orientation may be determined from a single image via using a neural network trained directly to determine an N degree-of-freedom pose. For example, a 3 degree-of-freedom pose may include azimuth, roll, and elevation. As another example, a 6 degree-of-freedom pose may include 3 degrees of freedom for orientation and 3 degrees of freedom for translation. As another example, a combination of 3 degrees of freedom for translation and 3 degrees of freedom for position may be used. For instance, a 2 degree-of-freedom pose may include 1 degree-of-freedom for orientation and 1 degree-of-freedom for the distance between the camera and the object.

In particular embodiments, any of the approaches involving a single image may be applied on a multi-view data set and the results combined (e.g., averaged) to improve the overall results. In general, any combination of the methods described herein may be used to increase robustness and/or provide a failsafe. For example, orientation may be independent estimated using three different methods, and then the results cross-checked.

While the present disclosure has been particularly shown and described with reference to specific embodiments thereof, it will be understood by those skilled in the art that changes in the form and details of the disclosed embodiments may be made without departing from the spirit or scope of the invention. Specifically, there are many alternative ways of implementing the processes, systems, and apparatuses described. It is therefore intended that the invention be interpreted to include all variations and equivalents that fall within the true spirit and scope of the present invention.

The invention claimed is:

1. A method comprising:
   determining a three-dimensional representation of a scene, captured in an action shot base video, the three-dimensional representation of the scene including a three-dimensional representation of a ground surface, the three-dimensional representation of the scene identifying a camera pose for motion of a camera along a path through space in the action shot base video;
   determining a representation of an object by estimating a three-dimensional model from a multi-view capture of the object, the multi-view capture including a plurality of images of the object, each of the images being captured from a different respective viewpoint, the multi-view capture being navigable in one or more dimensions; and
   generating an action shot video of the scene by combining the three-dimensional representation of the scene captured in the action shot base video and the three-dimensional model from the multi-view capture of the object, the action shot video including a rendered object determined based on the representation of the object and the camera pose and animated via an animation effect, the rendered object being positioned along the path through space.

2. The method recited in claim 1, wherein the action shot base video is captured by a camera, and wherein determining the three-dimensional representation comprises applying a 3D reconstruction of the scene.

3. The method recited in claim 1, wherein the action shot base video is a virtual scene, and wherein determining the three-dimensional representation comprises retrieving 3D model information associated with the virtual scene.

4. The method recited in claim 1, wherein the rendered object is a vehicle that includes one or more wheels, and wherein the animation effect comprises turning one or more of the wheels.

5. The method recited in claim 1, wherein applying the animation effect comprises animating one or more components of the rendered object.

6. The method recited in claim 5, wherein determining the representation of the object comprises generating a respective three-dimensional representation of each of the one or more components.

7. The method recited in claim 1, wherein the multi-view capture of the object is generated on a mobile computing device comprising a camera, and wherein each of the plurality of images of the object are captured by the camera.

8. The method recited in claim 7, wherein the mobile computing device includes an inertial measurement unit configured to capture inertial measurement data, and wherein determining the representation of the object involves analyzing the inertial measurement data.

9. The method recited in claim 1, wherein determining the representation of the object comprises determining a respective segmentation mask for the object in each of the images.

10. The method recited in claim 1, wherein determining the three-dimensional representation of the scene comprises estimating a location for a light source associated with the scene.

11. The method recited in claim 1, wherein generating an action shot video of the scene comprises rendering a reflection of the scene onto the determined object.

12. The method recited in claim 1, wherein determining the representation of the object comprises estimating a respective pose of the object for each of the images.

13. The method recited in claim 1, wherein estimating the three-dimensional model of the object comprises applying a neural network to one or more of the images.

14. The method recited in claim 1, the method further comprising:
generating a transition sequence between the action shot base video and the action shot video.

15. A system comprising:
a communications interface operable to determine a three-dimensional representation of a scene, captured in an action shot base video, the three-dimensional representation of the scene including a three-dimensional representation of a ground surface, the three-dimensional representation of the scene identifying a camera pose for motion of a camera along a path through space in the action shot base video;
a memory module operable to store a representation of an object by estimating a three-dimensional model from a multi-view capture of the object, the multi-view capture including a plurality of images of the object, each of the images being captured from a different respective viewpoint, the multi-view capture being navigable in one or more dimensions; and
a processor operable to generate an action shot video of the scene by combining the three-dimensional representation of the scene captured in the action shot base video and the three-dimensional model from the multi-view capture of the object, the action shot video including a rendered object determined based on the representation of the obiect and the camera pose and animated via an animation effect, the rendered object being positioned along the path through space.

16. The system recited in claim 15, wherein the action shot base video is captured by a camera, and wherein determining the three-dimensional representation comprises applying a 3D reconstruction of the scene.

17. The system recited in claim 15, wherein the action shot base video is a virtual scene, and wherein determining the three-dimensional representation comprises retrieving 3D model information associated with the virtual scene.

18. One or more non-transitory computer readable media having instructions stored thereon for performing a method, the method comprising:
determining a three-dimensional representation of a scene, captured in an action shot base video, the three-dimensional representation of the scene including a three-dimensional representation of a ground surface, the three-dimensional representation of the scene identifying a camera pose for motion of a camera along a path through space in the action shot base video;
determining a representation of an object by estimating a three-dimensional model from a multi-view capture of the object, the multi-view capture including a plurality of images of the object, each of the images being captured from a different respective viewpoint, the multi-view capture being navigable in one or more dimensions; and
generating an action shot video of the scene by combining the three-dimensional representation of the scene captured in the action shot base video and the three-dimensional model from the multi-view capture of the object, the action shot video including a rendered object determined based on the representation of the object and the camera pose and animated via an animation effect, the rendered object being positioned along the path through space.

* * * * *